United States Patent
Yudkovich et al.

(10) Patent No.: US 12,499,960 B2
(45) Date of Patent: Dec. 16, 2025

(54) STATISTICS BASED NON-VOLATILE MEMORY HEALTH MITIGATION

(71) Applicant: Sandisk Technologies, Inc., Milpitas, CA (US)

(72) Inventors: Shabtay Yudkovich, Nes Ziona (IL); David Avraham, Even-Yehuda (IL); Mahim Raj Gupta, Milpitas, CA (US)

(73) Assignee: Sandisk Technologies, Inc., Milpitas, CA (US)

(*) Notice: Subject to any disclaimer, the term of this patent is extended or adjusted under 35 U.S.C. 154(b) by 212 days.

(21) Appl. No.: 18/358,567

(22) Filed: Jul. 25, 2023

(65) Prior Publication Data

US 2024/0185940 A1 Jun. 6, 2024

Related U.S. Application Data

(60) Provisional application No. 63/430,185, filed on Dec. 5, 2022.

(51) Int. Cl.
*G11C 29/14* (2006.01)
*G11C 29/12* (2006.01)
*G11C 29/42* (2006.01)

(52) U.S. Cl.
CPC .......... *G11C 29/14* (2013.01); *G11C 29/1201* (2013.01); *G11C 29/42* (2013.01)

(58) Field of Classification Search
CPC ...... G11C 29/14; G11C 29/1201; G11C 29/42
See application file for complete search history.

(56) References Cited

U.S. PATENT DOCUMENTS

| | | | |
|---|---|---|---|
| 8,621,266 B2 * | 12/2013 | Kang | G06F 11/1068 714/763 |
| 8,930,778 B2 | 1/2015 | Cohen | |
| 9,419,655 B2 * | 8/2016 | Cai | G06F 11/1048 |
| 9,558,847 B2 | 1/2017 | Tuers et al. | |
| 9,721,652 B2 | 8/2017 | Puthenthermadam et al. | |
| 10,770,168 B2 | 9/2020 | Cadloni et al. | |
| 11,188,416 B2 | 11/2021 | Cadloni et al. | |
| 2017/0269991 A1 | 9/2017 | Bazarsky et al. | |
| 2021/0149800 A1 | 5/2021 | Yang et al. | |

* cited by examiner

*Primary Examiner* — Vanthu T Nguyen
(74) *Attorney, Agent, or Firm* — Pearl Cohen Zedek Latzer Baratz LLP

(57) ABSTRACT

Technology is disclosed herein for memory health monitoring and mitigation based on decoding statistics. Decoding a frame results in a decoding metric (syndrome weight, fail bit count) for that frame. The system tracks a statistic for different sets of frames. The statistic for a set is based on the decoding metrics for that set. The frames may be assigned to sets based on read reference voltages used to read frames or the physical location of the memory cells that store the frames. Memory health mitigation may be performed based on the decoding statistics. One example mitigation is to modify the read reference voltages for the set. Another example mitigation is to trigger reading at soft bit reference levels for a block. Another example mitigation is to trigger direct look ahead reading for a block. Still another example mitigation is to add a block to list of candidates for data refresh.

20 Claims, 19 Drawing Sheets

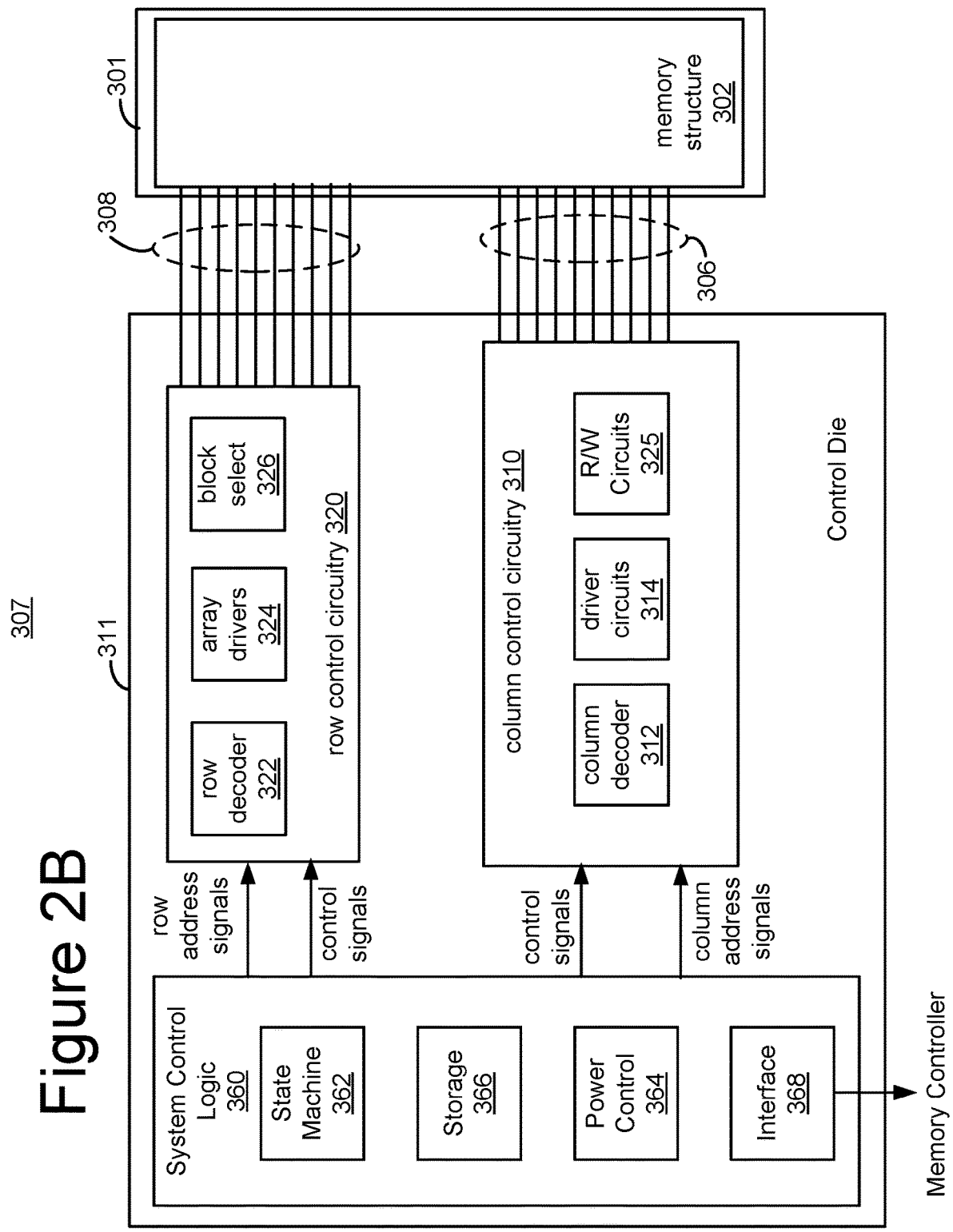

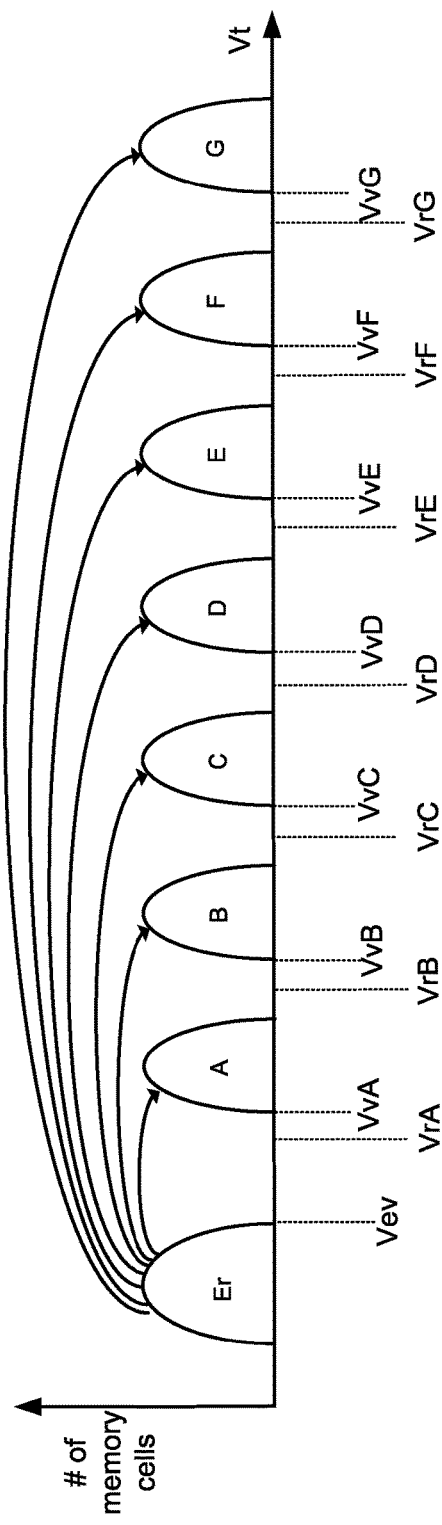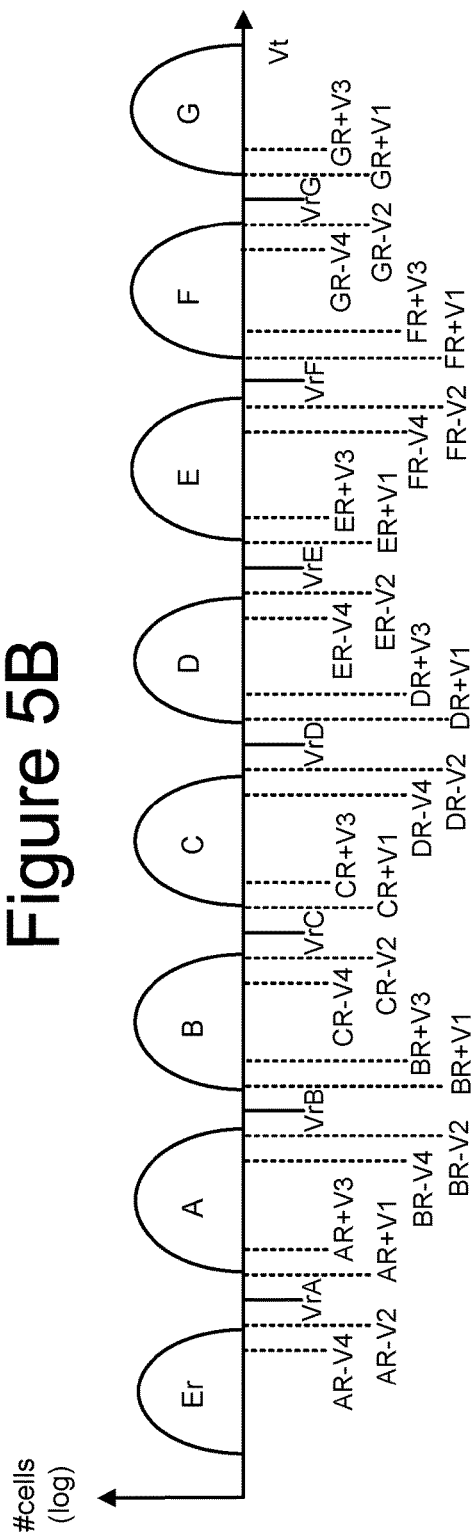

800

900

US 12,499,960 B2

STATISTICS BASED NON-VOLATILE MEMORY HEALTH MITIGATION

CLAIM OF PRIORITY

The present application claims priority from U.S. Provisional Patent Application No. 63/430,185, entitled "STATISTICS BASED NON-VOLATILE MEMORY HEALTH MITIGATION," by Yudkovich et al., filed Dec. 5, 2022, incorporated by reference herein in its entirety.

BACKGROUND

The present disclosure relates to non-volatile memory.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

The memory structure in the memory system typically contains many memory cells and various control lines. The memory structure may be arranged into units that are commonly referred to as blocks. For example, a block in a NAND memory system contains many NAND strings. A NAND string contains memory cell transistors connected in series, a drain side select gate at one end, and a source side select gate at the other end. Each NAND string is associated with a bit line. The block typically has many word lines that provide voltages to the control gates of the memory cell transistors. In some architectures, each word line connects to the control gate of one memory cell on each respective NAND string in the block. In some architectures a page is the basic unit of programming and reading. The memory cells in a page may all be connected to the same word line. However, note that more than one page of memory cells could be connected to the same word line in a block.

The non-volatile memory cells may be programmed to store data. Typically, the memory cells are programmed to a number of data states. Using two data states to store a single bit per cell is referred to herein as SLC programming. Using a greater number of data states allows for more bits to be stored per memory cell. Using additional data states to store two or more bits per cell is referred to herein as multi-bit per cell programming. For example, four data states may be used to store two bits per memory cell (MLC), eight data states may be used in order to store three bits per memory cell (TLC), 16 data states may be used to store four bits per memory cell (QLC), etc.

It is possible for there to be errors in the data at the time when the data is read from the non-volatile memory cells. It is typical to use some type of error correcting code (ECC) to recover from such errors. For example, an ECC encoder may generate parity bits based on the user data. The parity bits may be stored in the non-volatile memory cells. For example, an ECC codeword (or more briefly "codeword") that contains the user data and the parity bits may be stored in the memory cells. An ECC decoder may be used to run an ECC algorithm to detect and correct errors in the data. State of the art ECC solutions used in storage applications are often based on Low Density Parity Check (LDPC) codes.

NAND memory tends to behave differently during its life cycle and under different conditions such as temperature. Hence NAND calls for special treatment for these cases, which manifest in the flash management. However, flash management decisions tend to be responsive rather than proactive, dealing with challenges as they emerge rather them predicting them. For example, if an exception such as a decoding failure occurs for a particular ECC codeword then some mitigation effort might be triggered.

In addition, process non-uniformity brings variation between blocks, word lines, or other regions, which further challenges exception based mitigation schemes.

BRIEF DESCRIPTION OF THE DRAWINGS

Like-numbered elements refer to common components in the different figures.

FIG. 2B is a block diagram of one embodiment of an integrated memory assembly.

FIG. 5A depict threshold voltage distributions with hard bit reference levels and verify reference levels.

FIG. 5B depict threshold voltage distributions with hard bit reference levels and soft bit reference levels.

DETAILED DESCRIPTION

Figure 1A:
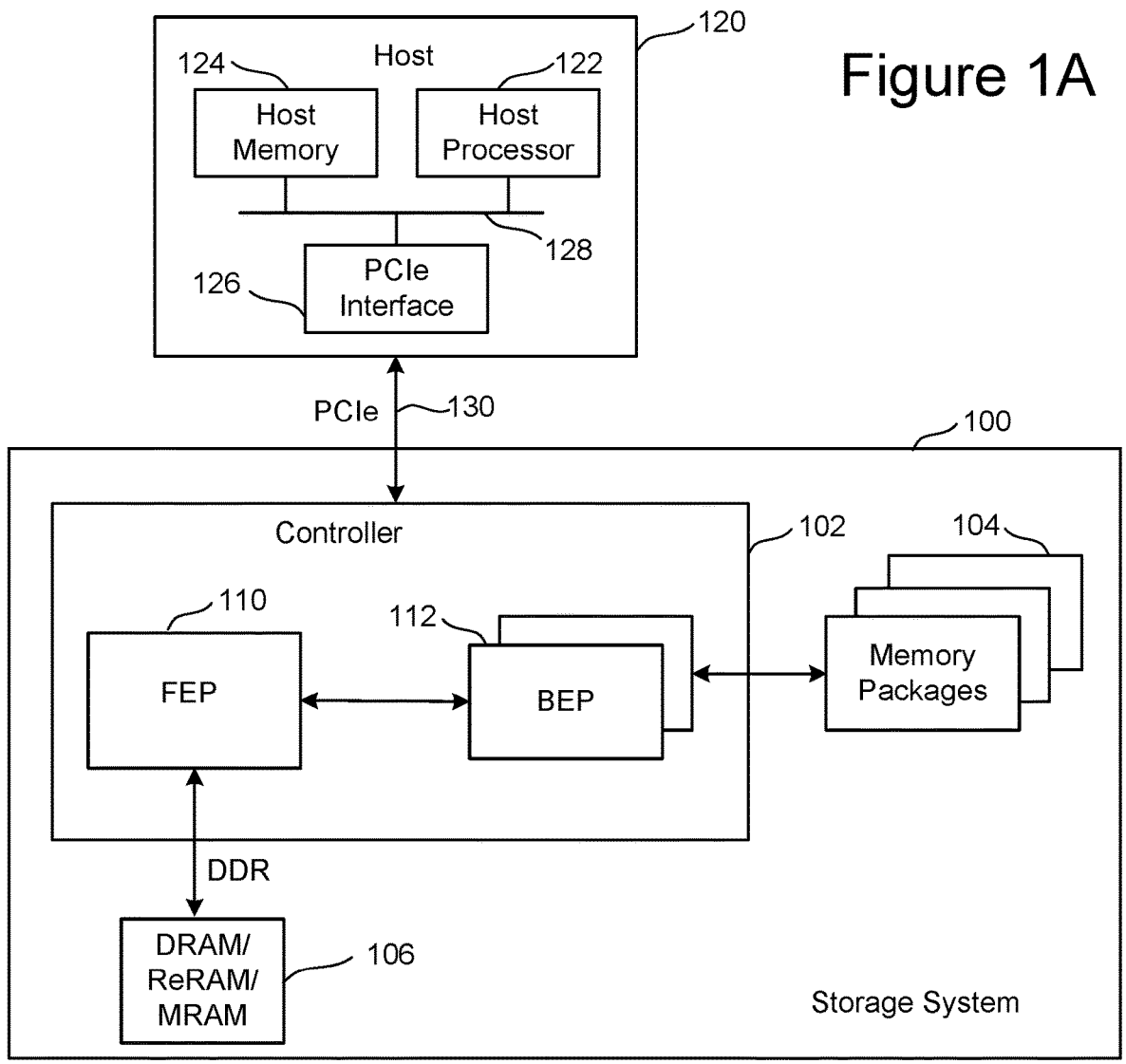
FIG. 1A is a block diagram of one embodiment of a non-volatile memory system connected to a host.

Technology is disclosed herein for memory health monitoring and mitigation based on decoding statistics. When a unit of data (e.g., page, fragment, frame, etc.) is read from the memory cells it is decoded. The unit of data has one or more ECC codewords. An example decoder is an LDCP decoder, but other types of decoders may be used. Decoding the unit of data results in one or more decoding metrics for that unit of data. Example decoding metrics include, but are not limited to, syndrome weight (SW), fail bit count (FBC) and bit error rate (BER). In an embodiment, the system tracks a decoding statistic for a number of sets of units of data. Each unit of data may be assigned to one of the sets. In one embodiment, the units of data are assigned to sets based on the read reference voltages used to read that unit of data. For example, units of data read using the same read reference voltages may be assigned to the same set. In one embodiment, the units of data are assigned to sets based on the physical location of the memory cells that store the unit of data. For example, units of data in the same physical block may be assigned to the same set. For each set, one or more decoding statistics is/are determined based on the decoding metric(s) for that set. Memory health mitigation may be performed based on the decoding statistics. One example of memory health mitigation is to modify the read reference voltages for the set. Another example memory health mitigation is to trigger reading at soft bit reference levels for a block. Another example memory health mitigation is to trigger direct look ahead (DLA) reading for a block. Still another example memory health mitigation is to add a block to list of candidates for data refresh.

As noted, the unit of data that is decided could be, but is not limited to, a page, a fragment, or a frame. A physical block may be divided into physical pages. A physical page is a set of memory cells that can be read or programmed concurrently in a physical block. In one example, a page is the unit of programming and/or the unit of reading, and a page comprises data in memory cells connected to a same word line. In other examples, different units of programming and reading can be used, and different arrangements of pages can be used. In some embodiments, pages are divided into fragments (also referred flash management units). In some example implementations, a fragment is the unit of programming and/or the unit of reading. In an embodiment, each fragment corresponds to one ECC codeword. In one example implementation, a page is 16 KB of data and a fragment is 4 KB of data; however, other amounts can also be implemented. A fragment may also be referred to herein as a frame.

Performing decoder statistic based memory health mitigation provides for proactive mitigation. For example, mitigation may be triggered in response to the statistic such as syndrome weight for the set exceeding a threshold. In some cases the statistic is based on the standard deviation (or sigma). For example, a 2-sigma tracker may track the $\mu+2\sigma$ value (e.g., 2 standard deviations above the mean) of a syndrome weight of frames in the set. If, for example, the $\mu+2\sigma$ value exceeds a threshold, health mitigation may be triggered. Note that the threshold and/or sigma (e.g., $1.5\sigma$, $2\sigma$, $3\sigma$, etc.) could be selected such that in many cases health mitigation is triggered prior to an exception. Therefore, mitigation may occur prior to an exception such as decoding failure of a particular unit of data in the set.

Decoder statistic based memory health mitigation helps to deal with over-mitigation due to outlier data units in a set such as block. For example, mitigation for a block may be based on the statistic for all of the units of data in the block. Some exception based mitigation techniques might trigger mitigation for an entire block due to one unit of data failing to decode. However, this outlier might not trigger mitigation in decoder statistic based mitigation if the statistic for the entire block does not warrant that mitigation be performed for the entire block.

FIG. 1A is a block diagram of one embodiment of a storage system 100 that implements the technology described herein. In one embodiment, storage system 100 performs memory health monitoring and mitigation based on decoding statistics as described herein. In one embodiment, storage system 100 is a solid state drive ("SSD"). Storage system 100 can also be a memory card. USB drive or other type of storage system. The proposed technology is not limited to any one type of storage system. Storage system 100 is connected to host 120, which can be a computer, server, electronic device (e.g., smart phone, tablet or other mobile device), appliance, or another apparatus that uses memory and has data processing capabilities. In some embodiments, host 120 is separate from, but connected to, storage system 100. In other embodiments, storage system 100 is embedded within host 120.

The components of storage system 100 depicted in FIG. 1A are electrical circuits. Storage system 100 of FIG. 1A comprises a memory controller 102, non-volatile memory 104 for storing data, and local memory (e.g., DRAM/ReRAM/MRAM) 106. The combination of the controller 102 and local memory 106 may be referred to herein as a memory system. Controller 102 comprises a Front End Processor (FEP) circuit 110 and one or more Back End Processor (BEP) circuits 112. In one embodiment FEP circuit 110 is implemented on an ASIC. In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase, and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory, such as storage class memory (SCM) based on resistive random access memory (such as ReRAM, MRAM, FeRAM or RRAM) or a phase change memory (PCM).

Controller 102 communicates with host 120 via an interface 130 that implements a protocol such as, for example, PCIe. Other interfaces can also be used, such as SCSI, SATA, etc. For working with storage system 100, host 120 includes a host processor 122, host memory 124, and a PCIe interface 126 connected along bus 128. Host memory 124 is the host's physical memory, and can be DRAM, SRAM, MRAM, non-volatile memory, or another type of storage. Host 120 is external to and separate from storage system 100. In one embodiment, storage system 100 is embedded in host 120.

Figure 1B:
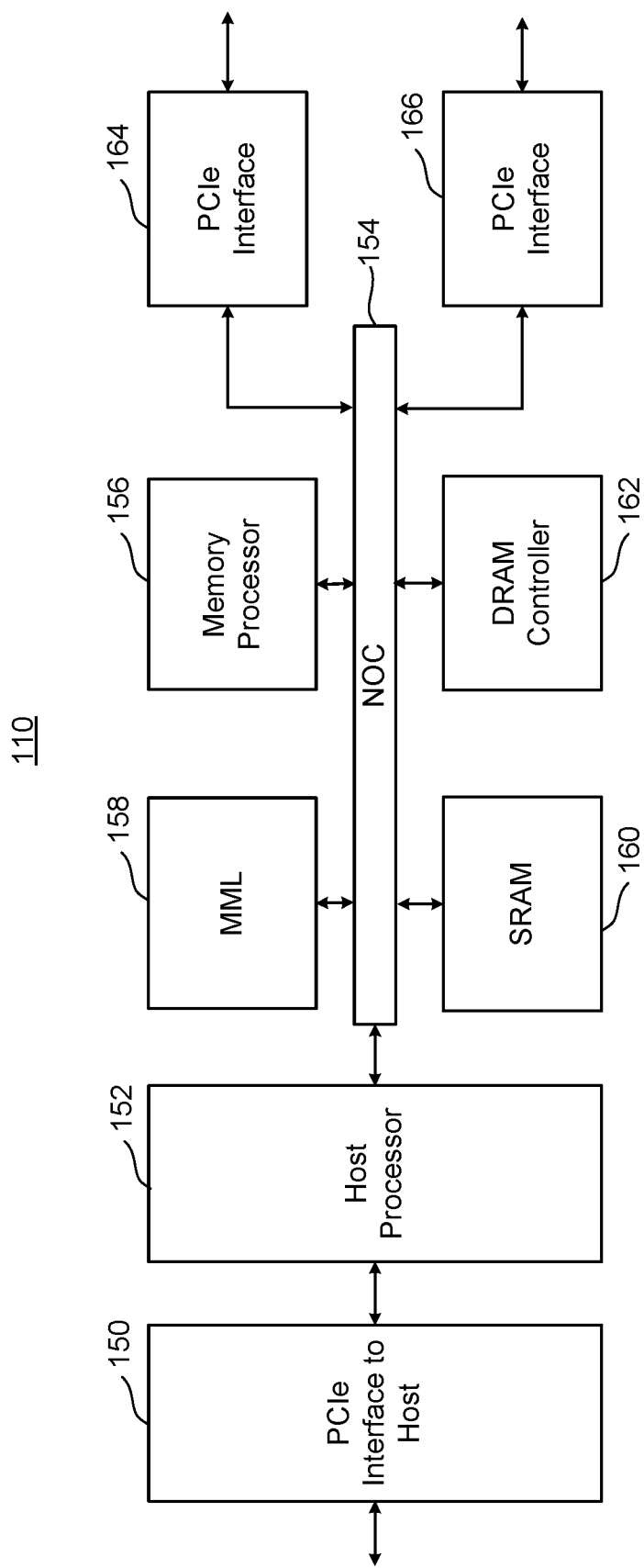
FIG. 1B is a block diagram of one embodiment of a Front End Processor Circuit. In some embodiments, the Front End Processor Circuit is part of a Controller.

FIG. 1B is a block diagram of one embodiment of FEP circuit 110. FIG. 1B shows a PCIe interface 150 (or "communication interface") to communicate with host 120 and a host processor 152 in communication with that PCIe interface. In one embodiment, host interface 150 implements an NVM Express (NVMe) over PCI Express (PCIe). Other interfaces can also be used, such as SCSI, SATA, etc. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 1B, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Media Management Layer (MML) 158 that performs memory management (e.g., garbage collection, wear leveling, load balancing, etc.), logical to physical address translation, communication with the host, and management of the overall operation of the SSD or other non-volatile storage system. The media management layer MML 158 may be integrated as part of the memory management that may handle memory errors and interfacing with the host. In particular. MML may be a module in the FEP circuit 110 and may be responsible for the internals of memory management.

MML 158 may implement a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 102 (e.g., the translation module) performs address translation between the logical addresses used by the host and the physical addresses used by the memory die. One example implementation is to maintain tables (e.g., "logical to physical" or "L2P" tables) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in memory packages 104 and a subset of the L2P tables are cached (L2P cache) in the local high speed memory 140.

Figure 1C:
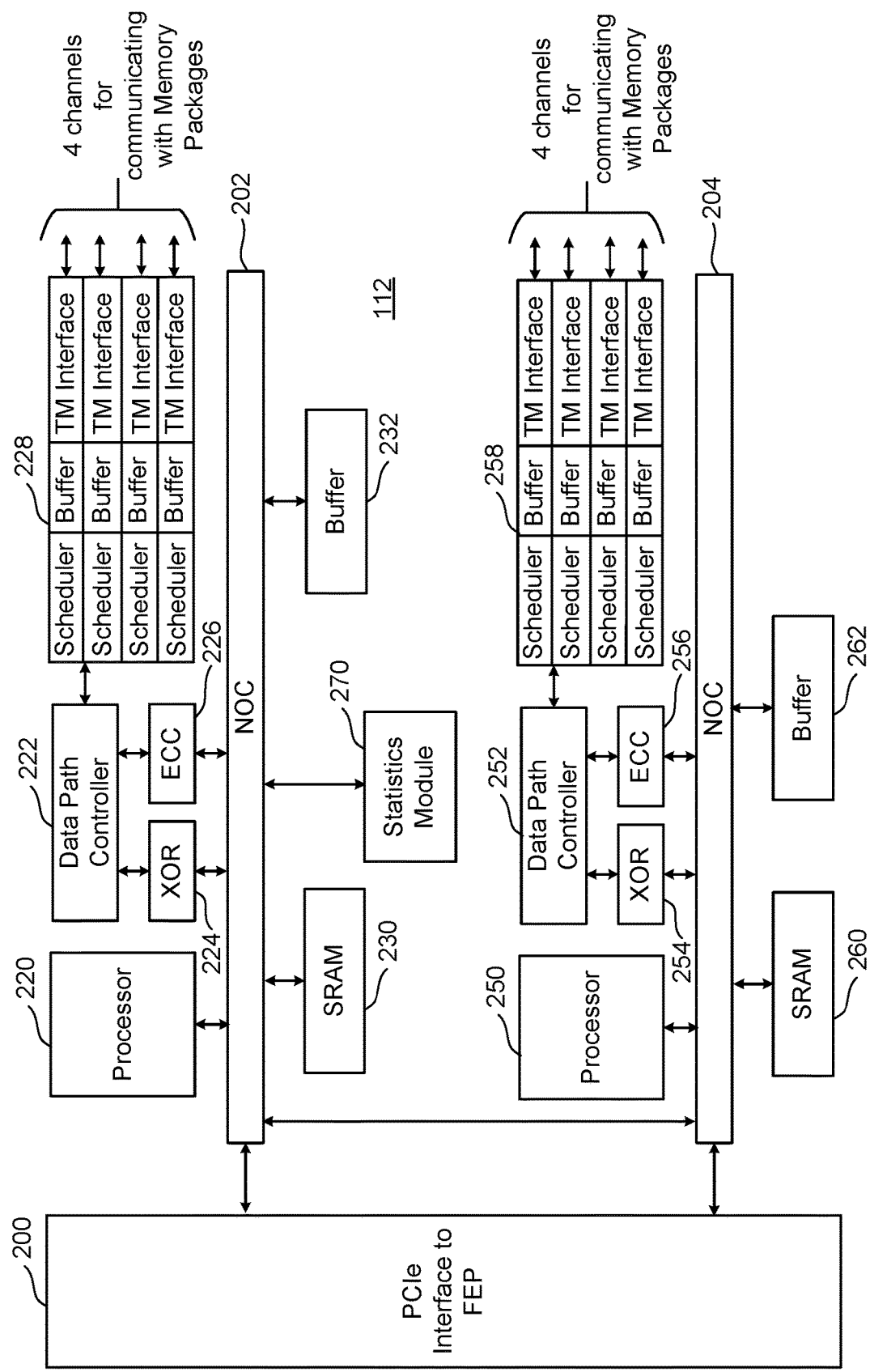
FIG. 1C is a block diagram of one embodiment of a Back End Processor Circuit. In some embodiments, the Back End Processor Circuit is part of a Controller.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. In one embodiment. ECC engines 226/256 are electrical circuits programmed by software. For example, ECC engines 226/256 can be a processor that can be programmed. In other embodiments, ECC engines 226/256 are custom and dedicated hardware circuits without any software. In another embodiment, the function of ECC engines 226/256 is implemented by processor 220. The XOR engines 224/254 are used to XOR the data so that data can be combined and stored in a manner that can be recovered in case there is a programming error. The statistics module 270 is used to collect statistics based on decoding data with the ECC 226/256. In an embodiment, the decoding statistics are used in memory heath management and mitigation. Optionally, the statistics module 270 could be located in FEP 110.

Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. There could be more or fewer than four channels. Each interface 228/258 includes four Toggle Mode interfaces (TM Interface), four buffers and four schedulers. In an embodiment, there is one scheduler, buffer, and TM Interface for each of the channels.

The processors 220/250 can be any standard processor known in the art. The data path controllers 222/252 can be a processor, FPGA, microprocessor, or other type of controller. In an embodiment, the XOR engines 224/254, ECC engines 226/256, and statistics module 270 are dedicated hardware circuits, known as hardware accelerators. In other embodiments, the XOR engines 224/254, ECC engines 226/256, and statistics module 270 can be implemented in software. In an embodiment, the scheduler, buffer, and TM Interfaces are hardware circuits.

Figure 1D:
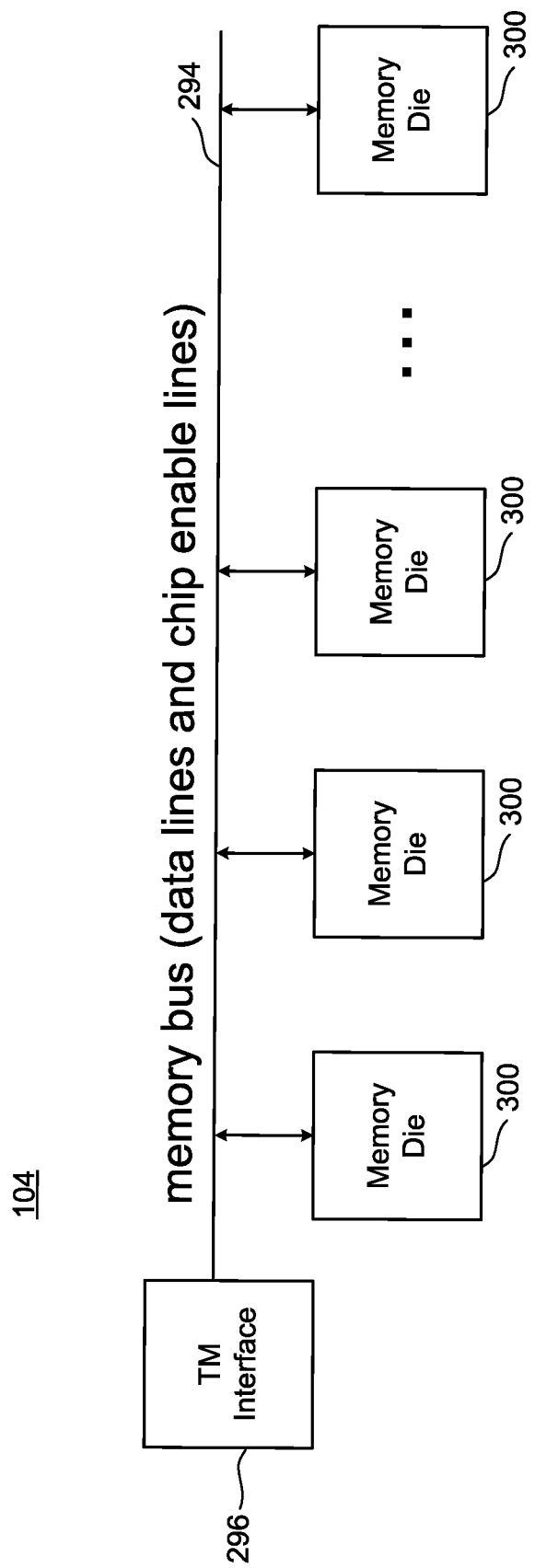
FIG. 1D is a block diagram of one embodiment of a memory package.

FIG. 1D is a block diagram of one embodiment of a memory package 104 that includes a plurality of memory die 300 connected to a memory bus (data lines and chip enable lines) 294. The memory bus 294 connects to a Toggle Mode Interface 296 for communicating with the TM Interface of a BEP circuit 112 (see e.g., FIG. 1C). In some embodiments, the memory package can include a small controller connected to the memory bus and the TM Interface. The memory package can have one or more memory dies. In one embodiment, each memory package includes eight or 16 memory dies; however, other numbers of memory dies can also be implemented. The technology described herein is not limited to any particular number of memory dies.

Figure 2A:
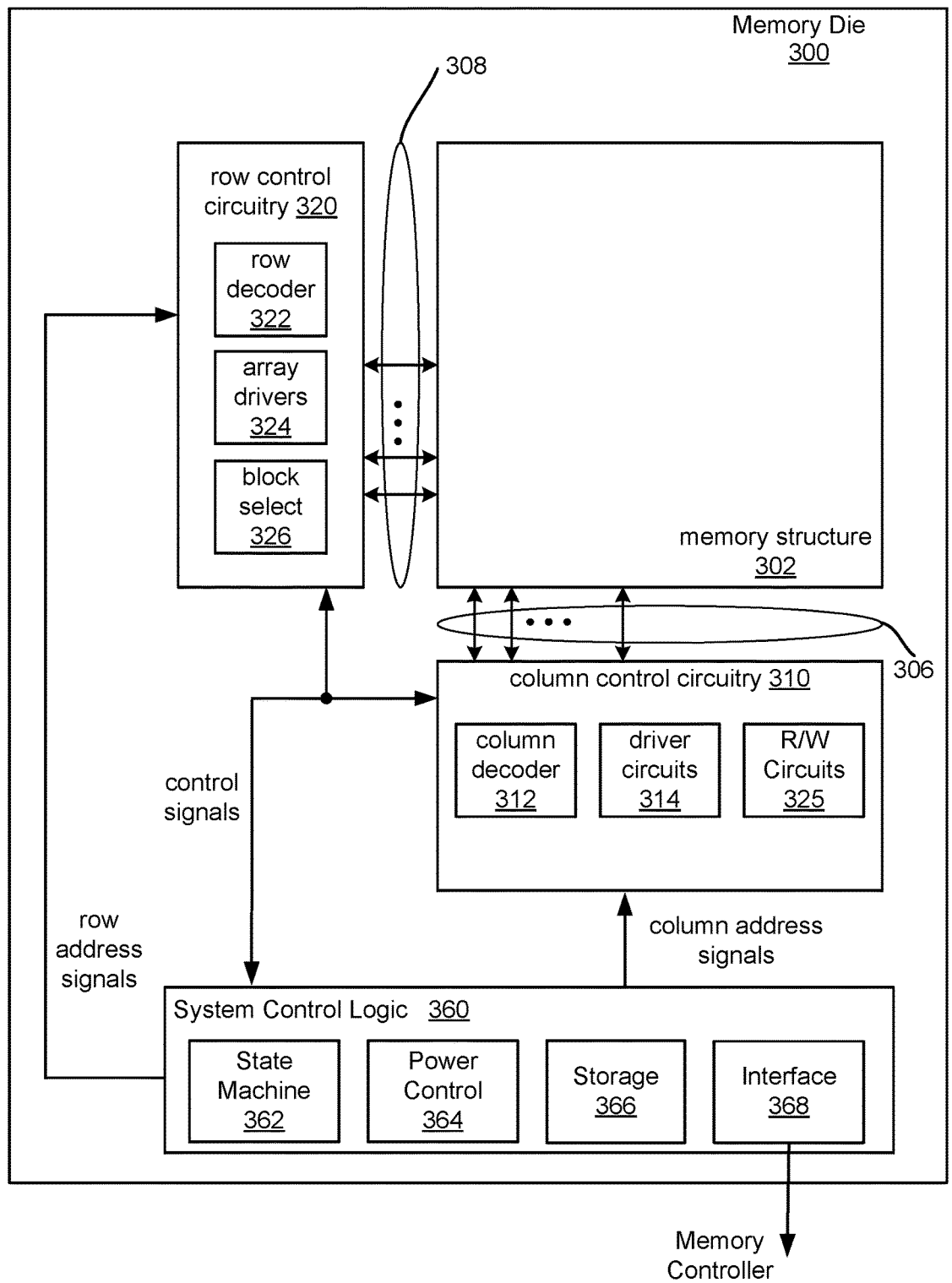
FIG. 2A is a block diagram of one embodiment of a memory die.

In one embodiment, non-volatile storage system 100 comprises one or more memory dies. FIG. 2A is a functional block diagram of one embodiment of a memory die 300 that comprises non-volatile storage system 100. Each of the one or more memory dies of non-volatile storage system 100 can be implemented as memory die 300 of FIG. 2A. The components depicted in FIG. 2A are electrical circuits. Memory die 300 includes a memory structure 302 (e.g., memory array) that can comprise non-volatile memory cells (also referred to as non-volatile storage cells), as described in more detail below. The array terminal lines of memory structure 302 include the various layer(s) of word lines organized as rows, and the various layer(s) of bit lines organized as columns. However, other orientations can also be implemented. Memory die 300 includes row control circuitry 320, whose outputs are connected to respective word lines of the memory structure 302. Row control circuitry 320 receives a group of M row address signals and one or more various control signals from System Control Logic circuit 360, and typically may include such circuits as row decoders 322, array drivers 324, and block select circuitry 326 for both reading and writing (programming) operations. Row control circuitry 320 may also include read/write circuitry. Memory die 30) also includes column control circuitry 310 including read/write circuits 325. The read/write circuits 325 may contain sense amplifiers and data latches. The sense amplifier(s) input/outputs are connected to respective bit lines of the memory structure 302. Although only a single block is shown for structure 302, a memory die can include multiple arrays that can be individually accessed. Column control circuitry 310 receives a group of N column address signals and one or more various control signals from System Control Logic 360, and typically may include such circuits as column decoders 312, array terminal receivers or driver circuits 314, as well as read/write circuitry 325, and I/O multiplexers.

System control logic 360 receives data and commands from memory controller 102 and provides output data and status to the host. In some embodiments, the system control logic 360 (which comprises one or more electrical circuits) includes state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. System control logic 360 can also include a power control module 364 that controls the power and voltages supplied to the rows and columns of the memory structure 302 during memory operations. System control logic 360 includes storage 366 (e.g., RAM, registers, latches, etc.), which may be used to store parameters for operating the memory structure 302.

Commands and data are transferred between memory controller 102 and memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used.

In some embodiments, all the elements of memory die 300, including the system control logic 360, can be formed as part of a single die. In other embodiments, some or all of the system control logic 360 can be formed on a different die than the die that contains the memory structure 302.

In one embodiment, memory structure 302 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 302 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory structure 302. No particular non-volatile memory technology is required for purposes of the new claimed embodiments proposed herein. Other examples of suitable technologies for memory cells of the memory structure 302 include ReRAM memories (resistive random access memories), magnetoresistive memory (e.g., MRAM. Spin Transfer Torque MRAM, Spin Orbit Torque MRAM), FeRAM, phase change memory (e.g., PCM, and the like. Examples of suitable technologies for memory cell architectures of the memory structure 302 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of current, voltage, light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 302 and (2) peripheral circuitry, which includes all of the other components depicted in FIG. 2A. An important characteristic of a memory circuit is its capacity, which can be increased by increasing the area of the memory die of storage system 100 that is given over to the memory structure 302; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the storage system 100 is the amount of area to devote to the memory structure 302 and the amount of area to devote to the peripheral circuitry.

Another area in which the memory structure 302 and the peripheral circuitry are often at odds is in the processing involved in forming these regions, since these regions often involve differing processing technologies and the trade-off in having differing technologies on a single die. For example, when the memory structure 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies. Three-dimensional NAND structures in particular may benefit from specialized processing operations.

To improve upon these limitations, embodiments described below can separate the elements of FIG. 2A onto separately formed dies that are then bonded together. More specifically, the memory structure 302 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 307. One or more integrated memory assemblies 307 may be used in the memory packages 104 of storage system 100. The integrated memory assembly 307 includes two types of semiconductor dies (or more succinctly, "die"). Memory structure die 301 includes memory structure 302. Memory structure 302 includes non-volatile memory cells. Control die 311 includes control circuitry 360, 310, and 320 (as described above). In some embodiments, control die 311 is configured to connect to the memory structure 302 in the memory structure die 301. In some embodiments, the memory structure die 301 and the control die 311 are bonded together.

FIG. 2B shows an example of the peripheral circuitry, including control circuits, formed in a peripheral circuit or control die 311 coupled to memory structure 302 formed in memory structure die 301. Common components are labelled similarly to FIG. 2A. System control logic 360, row control circuitry 320, and column control circuitry 310 are located in control die 311. In some embodiments, all or a portion of the column control circuitry 310 and all or a portion of the row control circuitry 320 are located on the memory structure die 301. In some embodiments, some of the circuitry in the system control logic 360 is located on the on the memory structure die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory structure die 301 may reduce the number of steps needed to fabricate such a die, adding such circuits to a die such as control die 311 may not require many additional process steps. The control die 311 could also be referred to as a CMOS die, due to the use of CMOS technology to implement some or all of control circuitry 360, 310, 320.

Figure 3A:
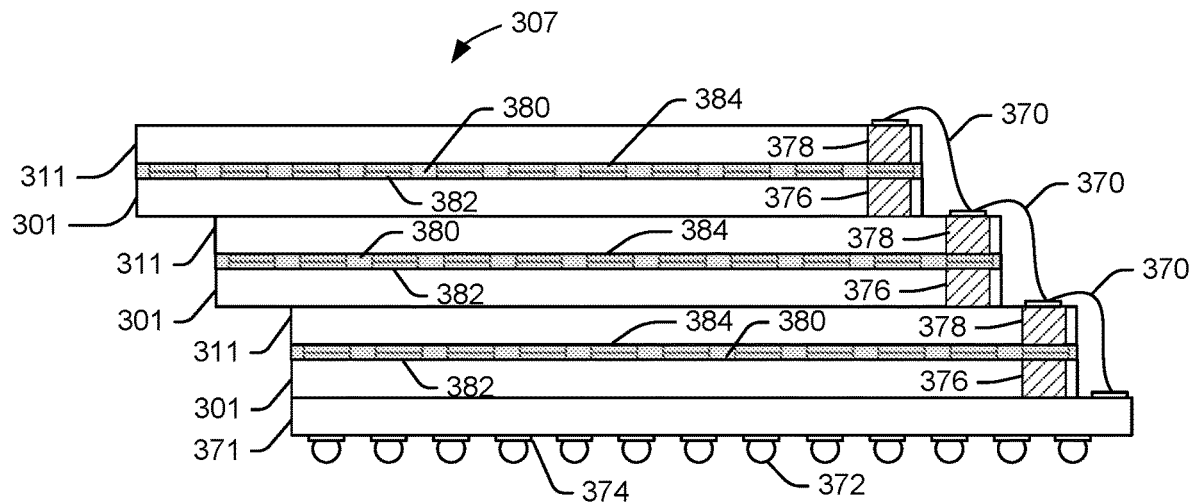
FIGS. 3A and 3B depict different embodiments of integrated memory assemblies.
Figure 3B:
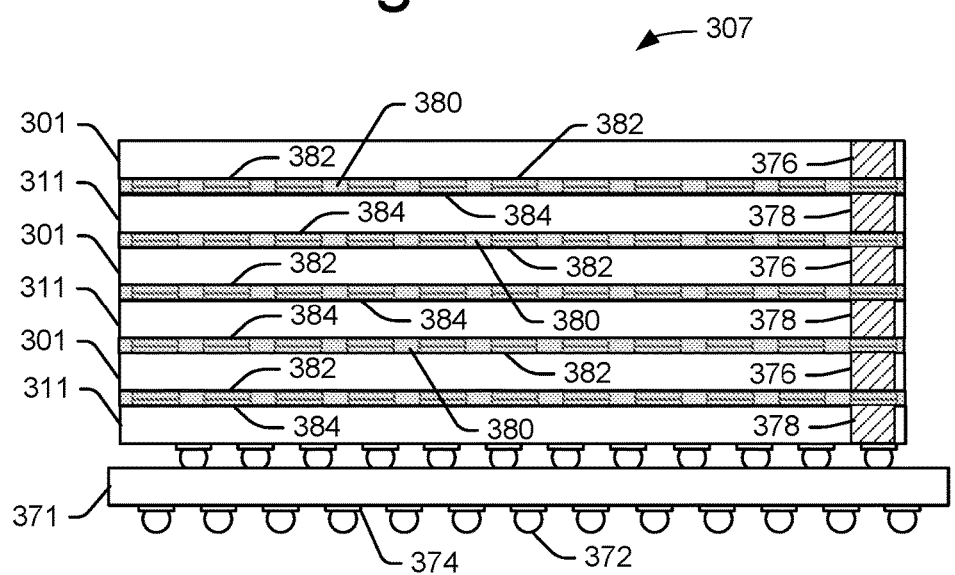

FIG. 3B shows column control circuitry 310 including read/write circuits 325 on the control die 311 coupled to memory structure 302 on the memory structure die 301 through electrical paths 306. For example, electrical paths 306 may provide electrical connection between column decoder 312, driver circuitry 314, and R/W circuits 325 and bit lines of memory structure 302. Electrical paths may extend from column control circuitry 310 in control die 311 through pads on control die 311 that are bonded to corresponding pads of the memory structure die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory structure 302 through electrical paths 308. Each electrical path 308 may correspond to a word line, dummy word line, or select gate line. Additional electrical paths may also be provided between control die 311 and memory structure die 301.

For purposes of this document, the phrases "a control circuit" or "one or more control circuits" can include any one of or any combination of memory controller 102. FEP 110. BEP 112, state machine 362, processor 220/250, data path controller 222, ECC 226/256, interface 228/258, host processor 152, memory processor 156, MML 158, all or a portion of system control logic 360, all or a portion of row control circuitry 320, all or a portion of column control circuitry 310, read/write circuits 325, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, memory controller 102, memory die 300, integrated memory assembly 307, and/or control die 311.

In some embodiments, there is more than one control die 311 and more than one memory structure die 301 in an integrated memory assembly 307. In some embodiments, the integrated memory assembly 307 includes a stack of multiple control dies 311 and multiple memory structure dies 301. FIG. 3A depicts a side view of an embodiment of an integrated memory assembly 307 stacked on a substrate 371 (e.g., a stack comprising control die 311 and memory structure die). The integrated memory assembly 307 has three control dies 311 and three memory structure dies 301. In some embodiments, there are more than three memory structure dies 301 and more than three control dies 311. In FIG. 3A there are an equal number of memory structure dies 301 and control dies 311; however, in one embodiment, there are more memory structure dies 301 than control dies 311. For example, one control die 311 could control multiple memory structure dies 301.

Each control die 311 is affixed (e.g., bonded) to at least one of the memory structure die 301. Some of the bond pads 382/284 are depicted. There may be many more bond pads. A space between two die 301, 311 that are bonded together is filled with a solid layer 380, which may be formed from epoxy or other resin or polymer. This solid layer 380 protects the electrical connections between the die 301, 311, and further secures the die together. Various materials may be used as solid layer 380.

The integrated memory assembly 307 may for example be stacked with a stepped offset, leaving the bond pads at each level uncovered and accessible from above. Wire bonds 370 connected to the bond pads connect the control die 311 to the substrate 371. A number of such wire bonds may be formed across the width of each control die 311 (i.e., into the page of FIG. 3A).

A memory die through silicon via (TSV) 376 may be used to route signals through a memory structure die 301. A control die through silicon via (TSV) 378 may be used to route signals through a control die 311. The TSVs 376, 378 may be formed before, during or after formation of the integrated circuits in the semiconductor dies 301, 311. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 372 may optionally be affixed to contact pads 374 on a lower surface of substrate 371. The solder balls 372 may be used to couple the integrated memory assembly 307 electrically and mechanically to a host device such as a printed circuit board. Solder balls 372 may be omitted where the integrated memory assembly 307 is to be used as an LGA package. The solder balls 372 may form a part of the interface between integrated memory assembly 307 and memory controller 102.

FIG. 3B depicts a side view of another embodiment of an integrated memory assembly 307 stacked on a substrate 371. The integrated memory assembly 307 of FIG. 3B has three control dies 311 and three memory structure dies 301. In some embodiments, there are many more than three memory structure dies 301 and many more than three control dies 311. In this example, each control die 311 is bonded to at least one memory structure die 301. Optionally, a control die 311 may be bonded to two or more memory structure dies 301.

Some of the bond pads 382, 384 are depicted. There may be many more bond pads. A space between two dies 301, 311 that are bonded together is filled with a solid layer 380, which may be formed from epoxy or other resin or polymer. In contrast to the example in FIG. 3A, the integrated memory assembly 307 in FIG. 3B does not have a stepped offset. A memory die through silicon via (TSV) 376 may be used to route signals through a memory structure die 301. A control die through silicon via (TSV) 378 may be used to route signals through a control die 311.

Solder balls 372 may optionally be affixed to contact pads 374 on a lower surface of substrate 371. The solder balls 372 may be used to couple the integrated memory assembly 307 electrically and mechanically to a host device such as a printed circuit board. Solder balls 372 may be omitted where the integrated memory assembly 307 is to be used as an LGA package.

As has been briefly discussed above, the control die 311 and the memory structure die 301 may be bonded together. Bond pads on each die 301, 311 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 301, 311. Where no such film is initially provided, a space between the die may be under filled with an epoxy or other resin or polymer. The under-fill material may be applied as a liquid which then hardens into a solid layer. This under-fill step protects the electrical connections between the dies 301, 311, and further secures the die together. Various materials may be used as under-fill material.

Figure 4:
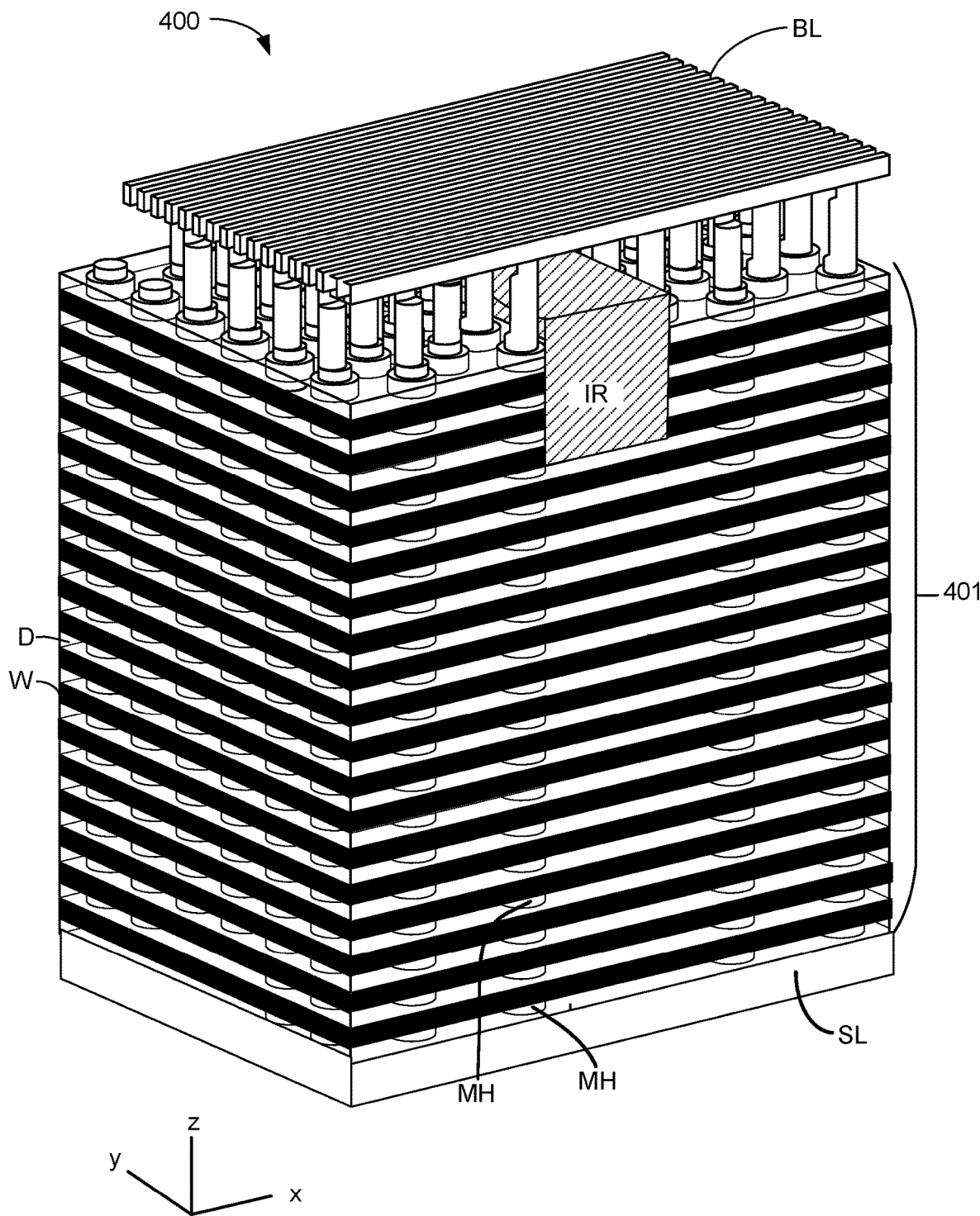
FIG. 4 is a perspective view of a portion of one example embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into four (or a different number of) regions (e.g., sub-blocks) by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
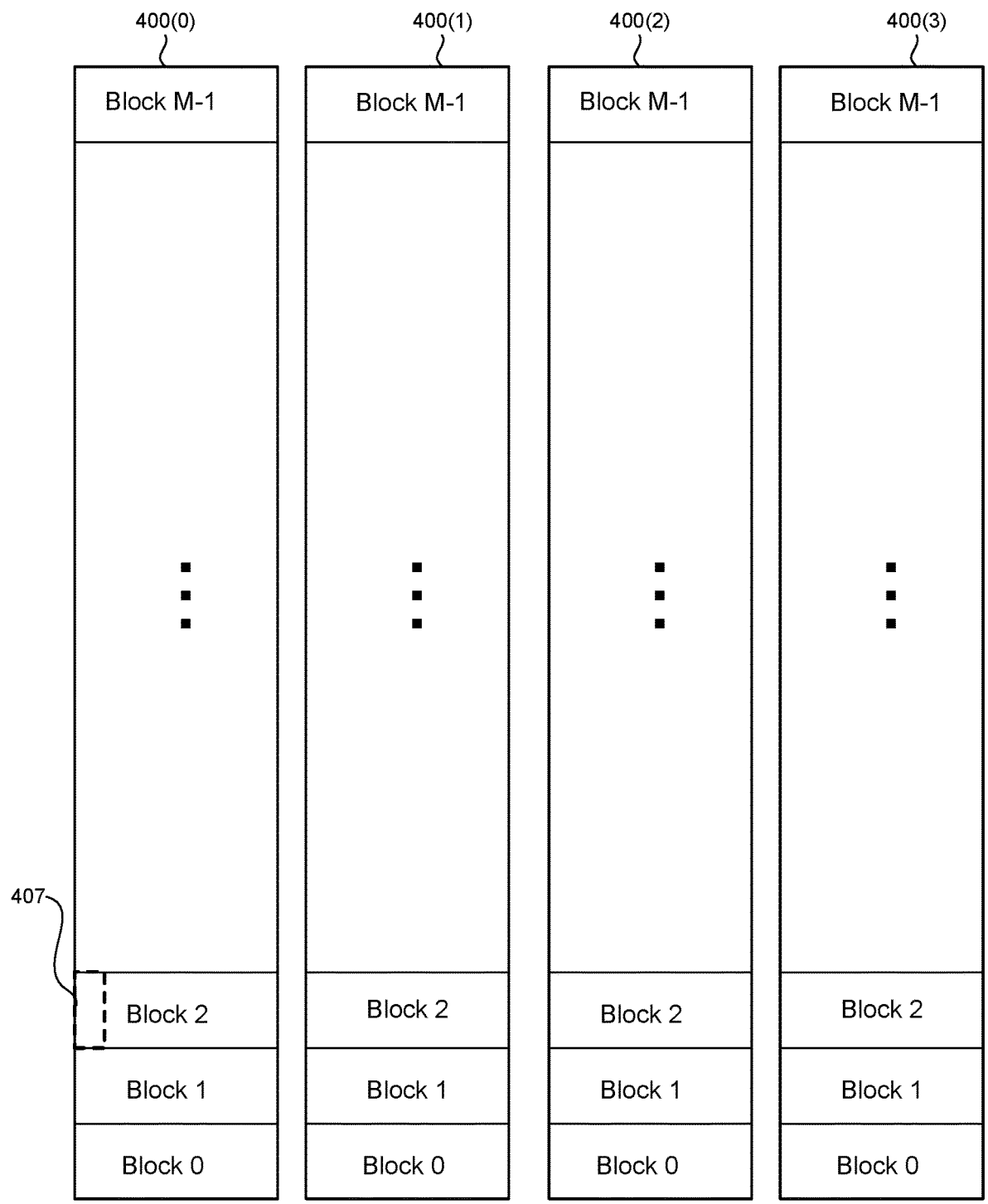
FIG. 4A is a block diagram of one embodiment of a memory structure having four planes.

FIG. 4A is a block diagram explaining one example organization of memory die, which is divided into four planes 400(0), 400(1), 400(2), 400(3). Each plane is then divided into M blocks. In one example, each plane 400 has about 2000 blocks. However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a group of connected memory cells as the memory cells of a block share a common set of word lines. For example, the word lines for a block are all connected to all of the vertical NAND strings for that block. Although FIG. 4A shows four planes 400(0)-400(3), more or fewer than four planes can be implemented. In some embodiments, memory structure 302 includes eight planes.

Figure 4B:
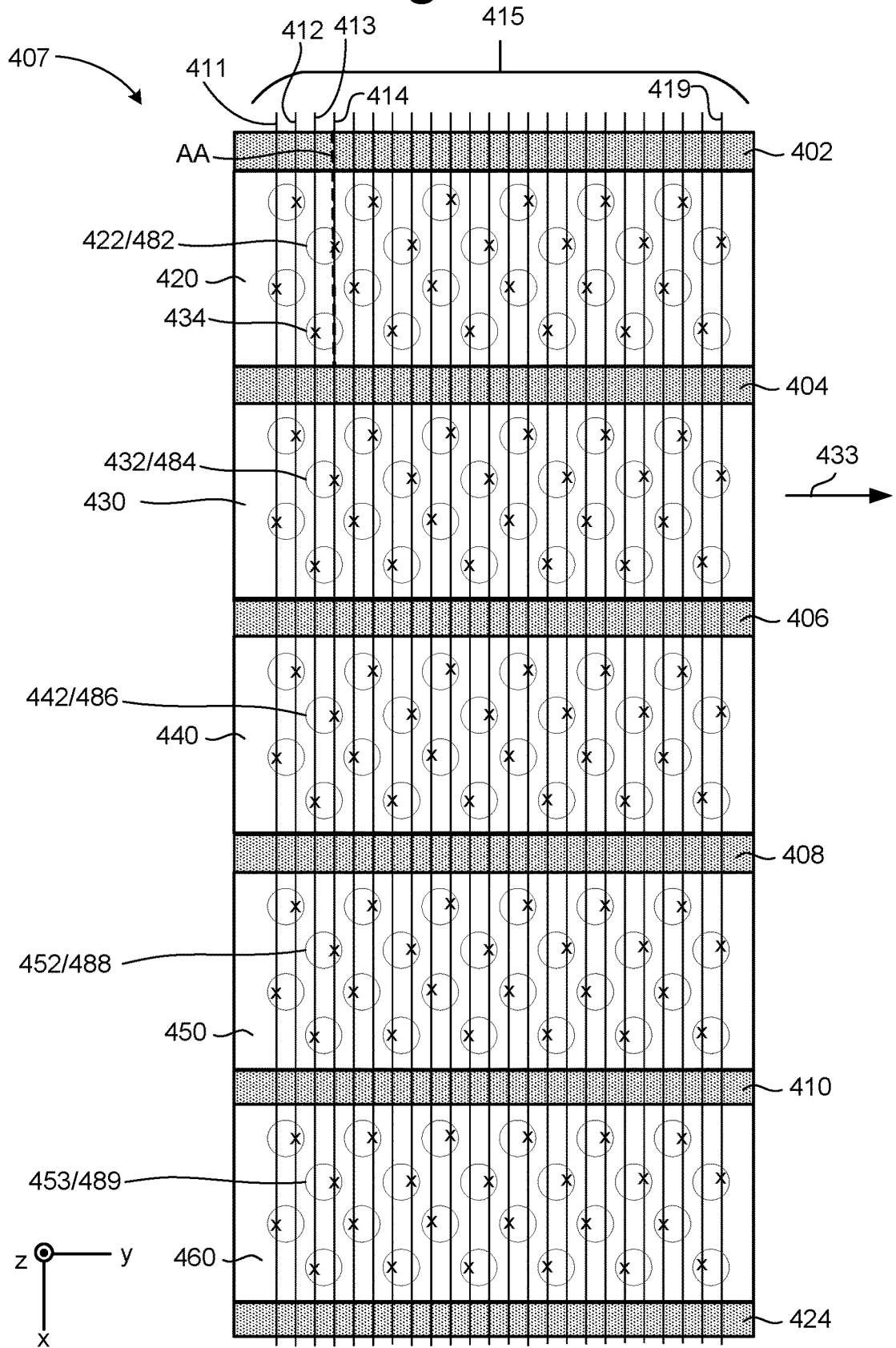
FIG. 4B is a block diagram depicting a top view of a portion of block of memory cells.
Figure 4C:
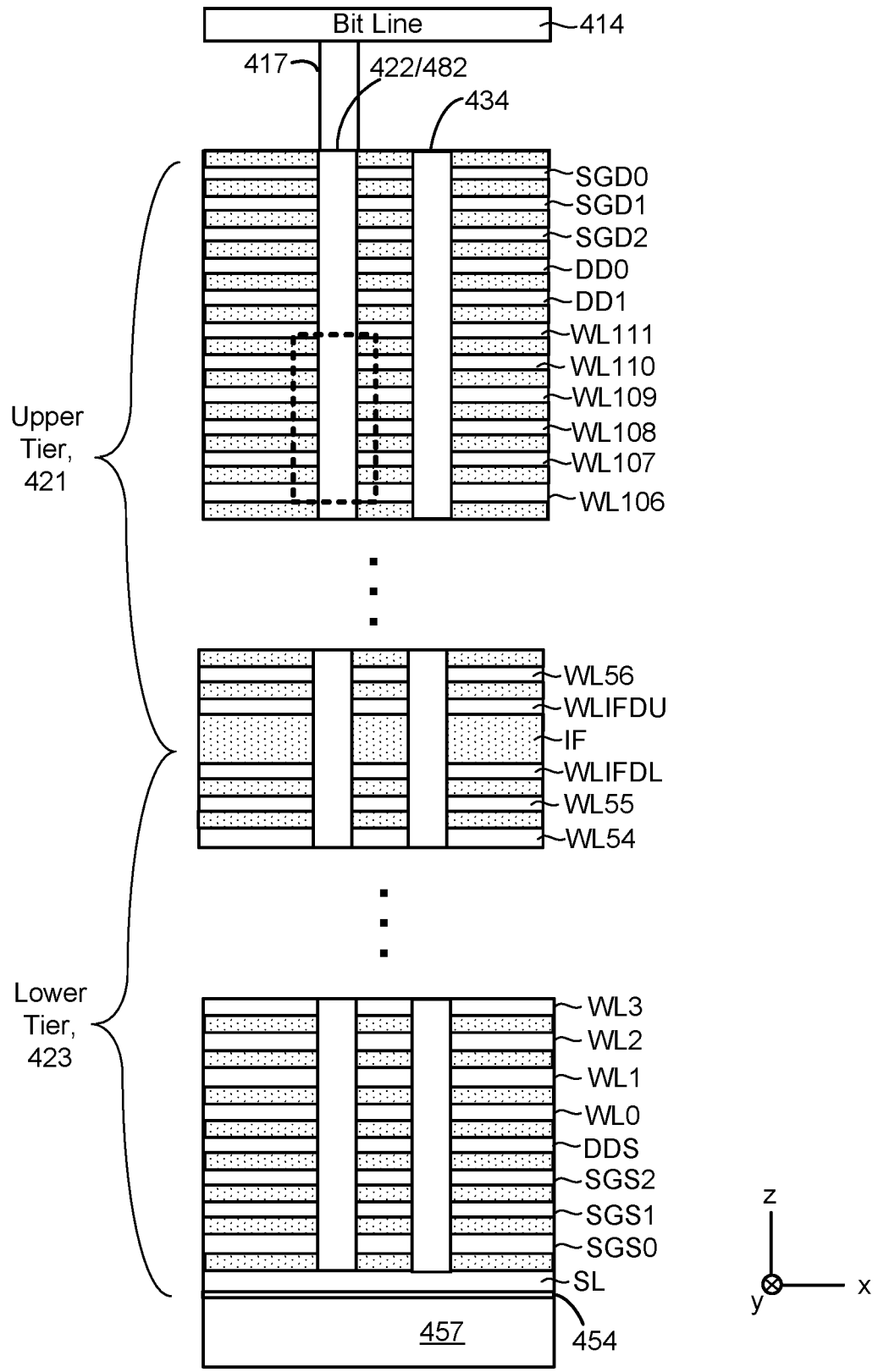
FIG. 4C depicts an embodiment of a stack showing a cross-sectional view along line AA of FIG. 4B.
Figure 4D:
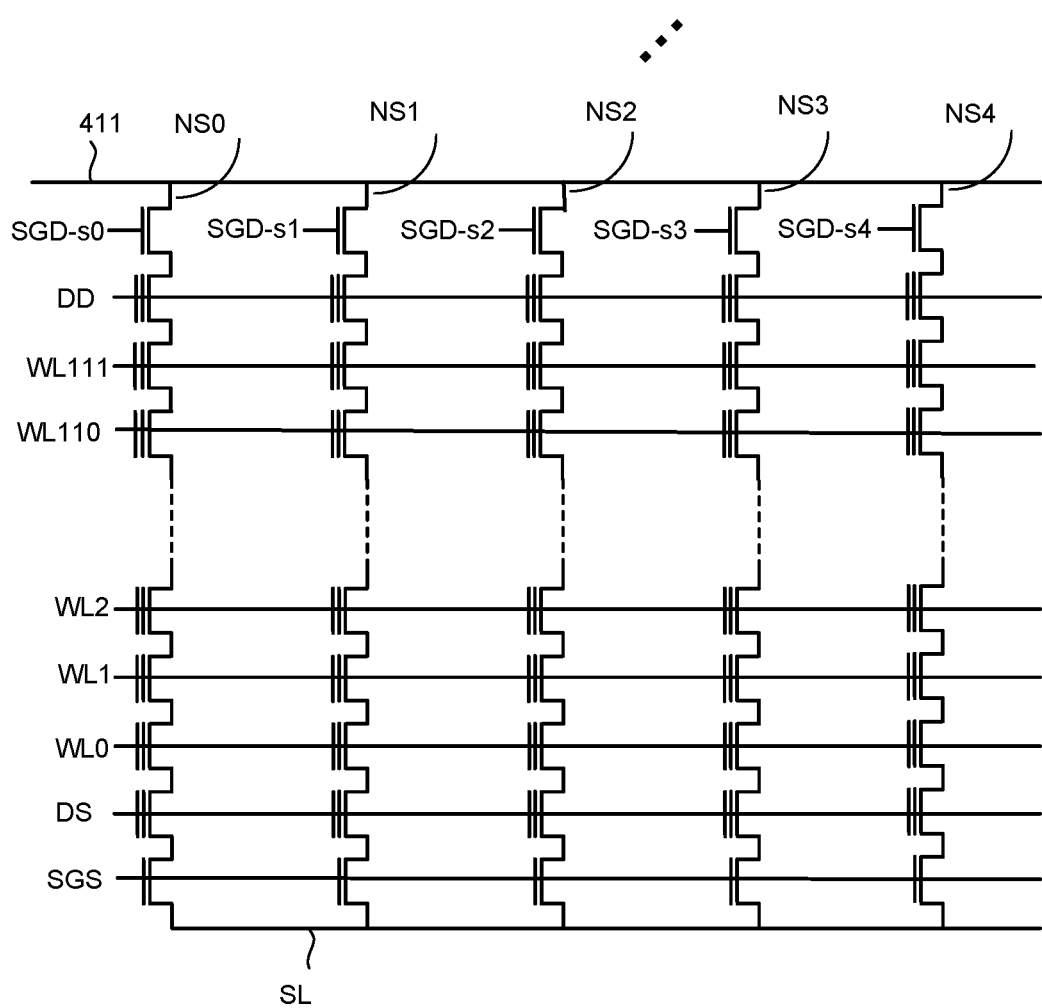
FIG. 4D is a schematic diagram of a portion of one embodiment of a block, depicting several NAND strings.

FIGS. 4B-4D depict an example three dimensional ("3D") NAND structure that corresponds to the structure of FIG. 4 and can be used to implement memory structure 202 of FIGS. 2A and 2B. FIG. 4B is a block diagram depicting a top view of a portion 407 of Block 2. As can be seen from FIG. 4B, the block depicted in FIG. 4B extends in the direction of arrow 433. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442, 452, and 453. Vertical column 422 implements NAND string 482. Vertical column 432 implements NAND string 484. Vertical column 442 implements NAND string 486. Vertical column 452 implements NAND string 488. Vertical column 453 implements NAND string 489. More details of the vertical columns are provided below. Since the block depicted in FIG. 413 extends in the direction of arrow 433, the block includes more vertical columns than depicted in FIG. 4B.

FIG. 4B also depicts a set of bit lines 415, including bit lines 411, 412, 413, 414, . . . 419. FIG. 4B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 414 is connected to vertical columns 422, 432, 442, 452, and 453.

The block depicted in FIG. 4B includes a set of isolation regions 402, 404, 406, 408, 410, and 424, which are formed of SiO$_2$; however, other dielectric materials can also be used. Isolation regions 402, 404, 406, 408, 410, and 424 serve to divide the top layers of the block into five regions; for example, the top layer depicted in FIG. 4B is divided into regions 420, 430, 440, 450, and 460 of which are referred to as sub-blocks. In one embodiment, isolation regions 402 and 424 separate the block from adjacent blocks. Thus, isolation regions 402 and 424 may extend down to the substrate. In one embodiment, the isolation regions 404, 406, 408, and 410 only divide the layers used to implement select gates so that NAND strings in different sub-blocks can be independently selected. Referring back to FIG. 4, the IR region may correspond to any of isolation regions 404, 406, 408 or 410. In one example implementation, a bit line only connects to one vertical column/NAND string in each of regions (sub-blocks) 420, 430, 440, 450 and 460. In that implementation, each block has twenty rows of active columns and each bit line connects to five vertical columns/NAND strings in each block. In one embodiment, all of the five vertical columns/NAND strings connected to a common bit line are connected to the same word line (or set of word lines); therefore, the system uses the drain side selection lines to choose one (or another subset) of the five to be subjected to a memory operation (program, verify, read, and/or erase).

Although FIG. 4B shows each region having four rows of vertical columns, five regions and twenty rows of vertical columns in a block, those exact numbers are an example implementation. Other embodiments may include more or fewer regions per block, more or fewer rows of vertical columns per region and more or fewer rows of vertical columns per block. FIG. 4B also shows the vertical columns being staggered. In other embodiments, different patterns of staggering can be used. In some embodiments, the vertical columns are not staggered.

FIG. 4C depicts a portion of one embodiment of a three dimensional memory structure 202 showing a cross-sectional view along line AA of FIG. 4B. This cross sectional view cuts through vertical columns (NAND strings) 422 and 434 of region 420 (see FIG. 4B). The structure of FIG. 4C includes three drain side select gate layers (SGD0, SGD1 and SGD2). The structure of FIG. 4C also includes three source side select gate layers (SGS0, SGS1 and SGS2). The structure of FIG. 4C also includes five dummy word line layers DD0, DD1, WLIFDU, WLIDDL, DDS; one hundred twelve word line layers WL0-WL111 for connecting to data memory cells. Dielectric layers are depicted between the conductive layers just described. Other embodiments can implement more or fewer than the numbers described above for FIG. 4C. In one embodiment, SGD0, SGD1 and SGD2 are electrically connected together; and SGS0, SGS1 and SGS2 are electrically connected together.

FIG. 4C depicts an embodiment of a stack having two tiers. The two-tier stack comprises an upper tier 421 and a lower tier 423. A two-tier other multi-tier stack can be used to form a relatively tall stack while maintaining a relatively narrow memory hole width (or diameter). After the layers of the lower tier are formed, memory hole portions are formed in the lower tier. Subsequently, after the layers of the upper tier are formed, memory hole portions are formed in the upper tier, aligned with the memory hole portions in the lower tier to form continuous memory holes from the bottom to the top of the stack. The resulting memory hole is narrower than would be the case if the hole was etched from the top to the bottom of the stack rather than in each tier individually. An interface (IF) region is created where the two tiers are connected. The IF region is typically thicker than the other dielectric layers. Due to the presence of the IF region, the adjacent word line layers suffer from edge effects such as difficulty in programming or erasing. These adjacent word line layers can therefore be set as dummy word lines (WLIFDL, WLIFDU). In some embodiments, the upper tier 421 and the lower tier 423 are erased independent of one another. Hence, data may be maintained in the lower tier 423 after the upper tier 421 is erased. Likewise, data may be maintained in the upper tier 421 after the lower tier 423 is erased.

Vertical columns 422 and 434 are depicted protruding through the drain side select layers, source side select layers, IF layer, dummy word line layers and word line layers. In one embodiment, each vertical column comprises a vertical NAND string. Below the vertical columns and the layers listed below is substrate 457, an insulating film 454 on the substrate, and source line SL. The NAND string of vertical column 422 has a source end at a bottom of the stack and a drain end at a top of the stack. As in agreement with FIG. 4B, FIG. 4C show vertical column 422 connected to bit line 414 via connector 417.

For ease of reference, drain side select layers, source side select layers, dummy word line layers, and data word line layers collectively are referred to as the conductive layers. In one embodiment, the conductive layers are made from a combination of TiN and Tungsten. In other embodiments, other materials can be used to form the conductive layers, such as doped polysilicon, metal such as Tungsten or metal silicide. In some embodiments, different conductive layers can be formed from different materials. Between conductive layers are dielectric layers. In one embodiment, the dielectric layers are made from SiO$_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WL0-W111 connect to memory cells (also called data memory cells). Dummy word line layers DD0, DD1 and DDS connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD0, SGD1, and SGD2 are used to electrically connect and disconnect (or cut off) the channels of respective NAND strings from bit lines. Source side select layers SGS0, SGS1, and SGS2 are used to electrically connect and disconnect (or cut off) the channels of respective NAND strings from the source line SL.

FIG. 4D is a schematic diagram of a portion of the memory depicted in FIGS. 4-4C. FIG. 4D shows physical word lines WL0-WL111 running across the entire block. The structure of FIG. 4D corresponds to portion 407 in Block 2 of FIGS. 4A-4B, including bit lines 411, 412, 413, 414, . . . 419. Within the block, each bit line is connected to five NAND strings. Drain side selection lines SGD-s0, SGD-s1, SGD-s2, SGD-s3 and SGD-s4 are used to determine which of the five NAND strings (NS0, NS1, NS2, NS3, NS4) connect to the associated bit line. Other NAND strings of the block and other bit lines are not depicted in FIG. 4D. A first sub-block corresponds to those vertical NAND strings controlled by SGD-s0. A second sub-block corresponds to those vertical NAND strings controlled by SGD-s1. A third sub-block corresponds to those vertical NAND strings controlled by SGD-s2. A fourth sub-block corresponds to those vertical NAND strings controlled by SGD-s3. A fifth sub-block corresponds to those vertical NAND strings controlled by SGD-s4. There may be more or fewer than five sub-blocks in a block. FIG. 4D shows that SGD select line connects to an SGD transistor on one of the NAND strings. There are many other NAND strings in the block that are not depicted in FIG. 4D. Each SGD select line will connect to all of the NAND strings on one sub-block. The SGD transistor may be used to connect/disconnect the NAND string channel to/from the bit line.

A source side selection line SGS connects/disconnects the NAND strings to/from the common source line. In some embodiments, there is a source side selection line for each sub-block (similar to the five SGD-s0, SGD-s1, SGD-s2, SGD-s3 and SGD-s4). The block can also be thought of as divided into five sub-blocks SB0, SB1, SB2, SB3, SB4. Sub-block SB0 corresponds to those vertical NAND strings controlled by SGD-s0, Sub-block SB1 corresponds to those vertical NAND strings controlled by SGD-s1, Sub-block SB2 corresponds to those vertical NAND strings controlled by SGD-s2, Sub-block SB3 corresponds to those vertical NAND strings controlled by SGD-s3, and Sub-block SB4 corresponds to those vertical NAND strings controlled by SGD-s4.

Although the example memories of FIGS. 4-4D are three dimensional memory structure that includes vertical NAND strings with charge-trapping material, other (2D and 3D) memory structures can also be used with the technology described herein.

The memory systems discussed above can be erased, programmed and read. Each memory cell may be associated with a memory state according to write data in a program command. Based on its memory state, a memory cell will either remain in the erased state or be programmed to a memory state (a programmed memory state) different from the erased state.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5A, each memory cell stores three bits of data. Other embodiments may use other data capacities per memory cell (e.g., such as two, four, or five bits of data per memory cell).

FIG. 5A shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. In an embodiment, the number of memory cells in each state is about the same.

FIG. 5A shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 5A also shows a number of verify reference voltages. The verify reference voltages are VvA, VvB, VvC, VvD, VvE, VvF, and VvG. In one embodiment, the verify reference voltages are VvA, VvB, VvC, VvD, VvE, VvF, and VvG are used when verifying memory cells. For example, when programming memory cells to data state A, the system will test whether those memory cells have a threshold voltage greater than or equal to VvA. If the memory cell has a threshold voltage greater than or equal to VvA, then the memory cell is locked out from further programming. Similar reasoning applies to the other data states.

In one embodiment, known as full sequence programming, memory cells can be programmed from the erased data state Er directly to any of the programmed data states A-G. For example, a population of memory cells to be programmed may first be erased so that all memory cells in the population are in erased data state Er. Then, a programming process is used to program memory cells directly into data states A, B, C, D, E, F and/or G. However, some memory cells will remain in the Er data state. For example, while some memory cells are being programmed from data state Er to data state A, other memory cells are being programmed from data state ER to data state B and/or from data state Er to data state C, and so on. The arrows of FIG. 5A represent the full sequence programming. The technology described herein can also be used with other types of programming in addition to full sequence programming (including, but not limited to, multiple stage/phase programming). In some embodiments, data states A-G can overlap, with memory controller 120 relying on ECC to identify the correct data being stored.

The read reference voltages VrA, VrB, VrC, VrD, VrE, VrF, and VrG are referred to herein as "hard bit read reference voltages." Note that when storing more or fewer than three bits per memory cell, there will be different hard bit read reference voltages. Reading the memory cells at these eight hard bit read reference voltages results in a three bit code, in some embodiments. Table I depicts one example coding scheme when storing three bits per memory cell

TABLE I

| Page | Erase | A | B | C | D | E | F | G | Reads/page |
|---|---|---|---|---|---|---|---|---|---|
| Upper | 1 | 1 | 1 | 0 | 0 | 0 | 0 | 1 | VrC, VrG |
| Middle | 1 | 1 | 0 | 0 | 1 | 1 | 0 | 0 | VrB, VrD, VrF |
| Lower | 1 | 0 | 0 | 0 | 0 | 1 | 1 | 1 | VrA, VrE |

In the coding scheme of Table I, the Erase state stores data bits 111, State A stores data bits 110, State B stores data bits 100, etc. The example in Table I is Gray coding because only one bit changes between any two adjacent states. Referring to FIG. 5A, the lower page can be read by reading at VrA and VrE. The middle page can be read by reading at VrB, VrD, and VrF. The upper page can be read by reading at VrC and VrG.

There is a small, but finite probability that reading a memory cell does not result in the same information that was intended to be programmed therein. For example, over time the amount of charge stored in the memory cell can change, resulting in a change in the threshold voltage of the memory cell. Therefore, a group of memory cells may be programmed with a codeword, which is determined based on an error correcting code (ECC). The codeword may represent the data redundantly. For example, to store 512 bytes of data, some memory cells may be used to store the actual data and others may be used to store error correcting codes.

The information from reading the memory cells at the hard bit read reference voltages may be fed into a hard decoder, in one embodiment. In some embodiments, the input to the hard decoder is just the bits of information from the codeword. In other words, when storing three bits per memory cell, the information is just three bits. This information is referred to herein as "hard bits". The hard bit decoder decodes the hard bits to attempt to arrive at the original data. In many cases, this will be successful. However, sometimes the decoding process will be unable to successfully decode the information. One technique for proceeding is to then shift the hard bit read reference levels and again attempt to decode the newly read information. This is referred to herein as "modifying the hard bit read reference voltages." However, sometimes even with such shifts of the hard bit read reference levels, the hard bit decoder is still unable to successfully decode the information to recover the original data. Modifying hard bit read reference voltages is one type of mitigation for memory health issues. In some embodiments, the hard bit read reference voltages are modified in response to a decoding statistic for a set of units of data exceeding a threshold. This allows for proactively modifying the read reference voltages even if a decoding exception does not occur.

One technique for reading memory cells is to read the group of memory cells at a set of "soft bit read reference voltages," in additional to the hard bit read reference voltages. FIG. 5B depicts one example of a set of soft bit read reference voltages. Near the hard bit read reference voltage "VrA" are soft bit read reference voltages AR+V1, AR-V2, AR+V3, and AR-V4. Similar soft bit read reference voltages are near the other hard bit read reference voltages. Each memory cell in a group can be read at the both the hard bit read reference voltages and the soft bit read reference voltages. The information from these reads may be fed into a decoder, which attempts to recover the original information that was programmed into the group. In some embodiments, a soft decoder is used. One embodiment of a soft decoder has as input, for each bit of the codeword, a probability measure that the bit that was read is the bit that was intended to be programmed. This probability is expressed as a log likelihood ratio (LLR), in one embodiment. An LLR is the logarithm of the ratio of the probability that the bit that was written was "0" to the probability that the bit that was written was a "1", given the read threshold voltage. The additional information learned by reading the soft bits can greatly increase the ability to successfully decode the information. Reading memory cells at soft bit reference levels is one type of mitigation for memory health issues. In some embodiments, the cells are read at the soft bit read reference voltages in response to a decoding statistic for a block of cells exceeding a threshold. This allows for proactively using soft bits for the block even if a decoding exception does not occur in the block.

Figure 6:
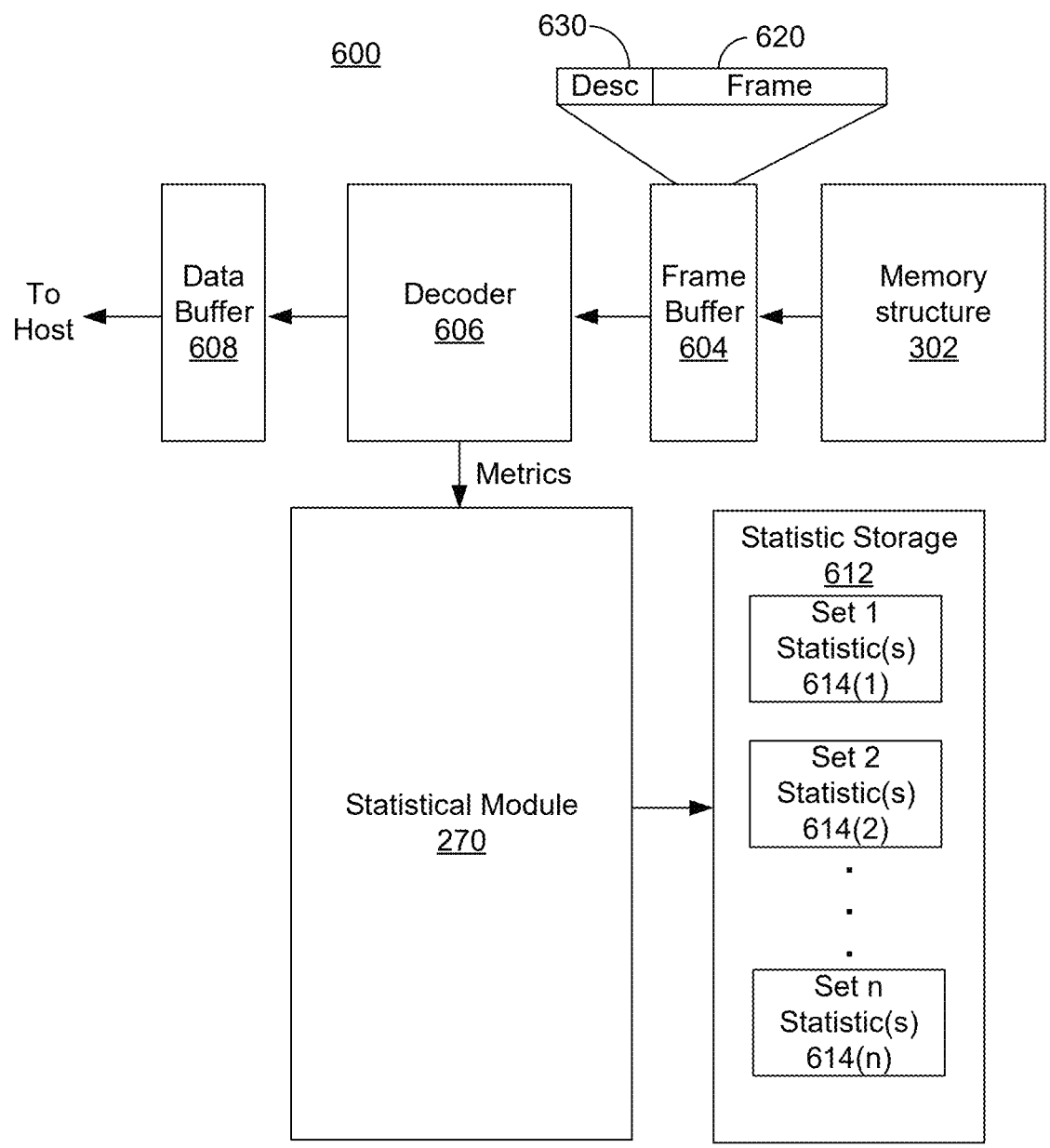
FIG. 6 is a block diagram of one embodiment of a system that performs decoder statistic based memory health management and mitigation.

FIG. 6 is a block diagram of one embodiment of a system 600 that performs decoder statistic based memory health management and mitigation. Data units from the memory structure 302 are read and temporarily stored in the frame buffer 604. In the example in FIG. 6 the units of data are referred to as frames 620. Each frame 620 contains one or more ECC codewords. In an embodiment, each frame 620 is assigned to a set for which one or more decoding statistics are tracked. The system 600 keeps track of a number of different sets. In one embodiment a descriptor (Desc) 620 is added to each frame 620 to indicate the set to which the frame is assigned. Typically, the sets are defined based on something the frames have in common. In one embodiment, the sets are defined based on what set of read reference voltages are used to read the frames, which may be referred to herein as time tag groups. As an example, the system 600 could track 16 different time tag groups. In one embodiment, the same read reference voltages are used to read all frames in a particular time tag group. However, different read reference voltages may be used for different time tag groups. In one embodiment, the sets are defined based on the physical location of the memory cells that store the frame. For example, all of the frames stored in a block may be assigned to the same set. This assignment to sets could be on a block-by-block basis. In a block-by-block assignment, each block corresponds to one set. However, multiple blocks could be assigned to the same set to reduce the number of sets.

The decoder 606 is configured to decode the frame 620. In one embodiment, the decoder 606 contains an LDCP decoder. In one embodiment, the decoder 606 is implemented in the BEP 112 as ECC 226/256, although the decoder 606 may be implemented elsewhere. Also, the decoder 606 is not required to be an LDCP decoder. The decoder 606 may contain elements in addition to an LDCP decoder such as a cyclic redundancy check (CRC) and a descrambler.

After decoding the frame 620 the decoded and error corrected data is temporarily stored in the data buffer 608, where it may be combined with other decoded data and provided to the host 120. Decoding the frame 620 will produce one or more decoding metrics for the frame 620. Example decoding metrics include, but are not limited to, a syndrome weight (SW), fail bit count (FBC), and bit error rate (BER). The one or more decoding metrics for the frame 620 are provided to the statistics module 270. The statistics module 270 determines at least one decoding statistic for a particular set based on the metric(s) for the frames in that particular set. The decoding statistics are stored in the statistic storage 612. Statistic storage 612 shows an example in which decoding statistics (614(1), 614(2), . . . 614(n)) are being tracked for a corresponding n sets of frames.

Note that when tracking the decoding statistic for frames in a set it is not required that the statistic be based on every frame in the set. For example, there may be some frames in the set that have not been decoded since collection of the statistic for that set has begun. In one embodiment, the decoding statistic for frames in a set may be based on decoding some frames multiple times. For example, there may be some frames in the set that were decoded multiple times since collection of the statistic for that set has begun, in which case the decoding statistic may be based on, for example, the syndrome weight each time each particular frame was decoded. Also, note that from time to time the system may discard the collected statistics for a set such as when the system decides to track a different set of frames. Thus, the decoding statistic for frames in a particular set is not required to be a lifetime statistic, but could cover some recent time period.

There are many types of statistics that can be tracked. The statistic could be tracked based on a statistical mean ($\mu$), statistical median, standard deviation (sigma or $\sigma$), or other statistical measure. The system may track more than one statistic. For example, there could be one or more of a mean value tracker, median value tracker, 1-sigma tracker, 2-sigma tracker, 4-sigma tracker, etc. In an embodiment, a mean value tracker will track the statistical mean of a decoding metric (e.g., SW, FBC, BER) of frames in a set. In an embodiment, a median value tracker will track the statistical median of a decoding metric (e.g., SW, FBC, BER) of frames in a set. In an embodiment, a 1-sigma tracker will track the $\mu+\sigma$ value (e.g., 1 standard deviation above the mean) of a decoding metric (e.g., SW, FBC, BER) of frames in a set. In an embodiment, a 2-sigma tracker will track the $\mu+2\sigma$ value (e.g., 2 standard deviations above the mean) of a decoding metric (e.g., SW. FBC. BER) of frames in a set. In an embodiment, a 4-sigma tracker will track the $\mu+4\sigma$ value (e.g., 4 standard deviations above the mean) of a decoding metric (e.g., SW, FBC, BER) of frames in a set. In some cases, a statistic tracked by a 2-sigma tracker ($\mu+2\sigma$ value) serves as a useful statistic to trigger health problem mitigation. However, a different value of sigma may be used.

In one embodiment, the statistics 614 for a set includes a histogram. As one example, there could be ten bins with each bin corresponding to a certain range in values for a metric such as syndrome weight. Each bin may track a count of the number of frames in the set having a value within the range for that bin.

In one embodiment, the statistics module 270 tracks a fewer number of sets at one point in time than are being tracked in the storage system 100. For example, the statistics module 270 may be a hardware unit that has hardware to track 16 different sets at one point in time. However, there may be more than 16 time tags being tracked in the storage system 100. In an embodiment, a round robin approach is taken to allow the statistics module 270 to track the higher number of time tags. As one example, the total number of time tags tracked for the storage system 100 may be divided into time tag groups. The total number of time tags may be divided by the number of sets that the statistics module 270 can track at one time.

In an embodiment, the decoder 606 and statistics module 270 are dedicated hardware circuits. In other embodiments, the decoder 606 and/or statistics module 270 can be implemented in software. For example, the decoder 606 and/or statistics module 270 could be implemented at least in part by executing processor executable instructions on processor 220/250 (see FIG. 1C). The frame buffer 604, data buffer 608, and statistic storage 612 may be implemented in volatile or non-volatile memory. For example, the frame buffer 604, data buffer 608, and statistic storage 612 may be implemented in DRAM, SRAM, MRAM, etc.

Figure 7:
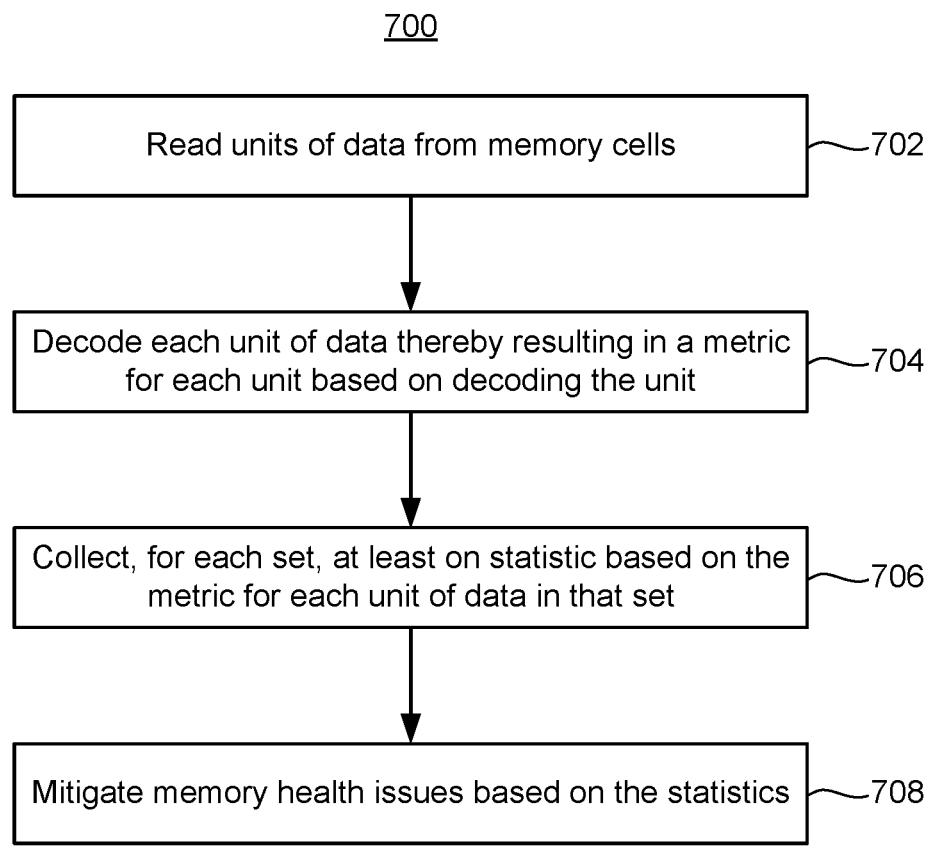
FIG. 7 is a flowchart of one embodiment of a process of memory health mitigation based on decoding statistics.

FIG. 7 is a flowchart of one embodiment of a process 700 of memory health mitigation based on decoding statistics. The process 700 may be performed by the memory controller 102, but is not limited thereto. The steps are described in a certain order as a matter of convenience of explanation. Step 702 includes reading units of data from memory cells. In one embodiment, these are NAND memory cells, but the process 700 is not limited to NAND. Step 702 refers to reading many different units of data and may be spread out over time, with other steps of process 700 being performed interleaved with step 702. Each unit of data contains at least one ECC codeword. In some cases, the unit of data will contain more than one ECC codeword.

Step 704 includes decoding unit of data thereby resulting in a decoding metric for the units of data based. The decoding metric is learned as a result of the decoding process. Example decoding metrics include, but are not limited to, a syndrome weight (SW), fail bit count (FBC), and bit error rate (BER).

Step 706 includes collecting, for each set, at least one statistic based on the decoding metric for units of data in the set. For example, a statistic is determined for a time tag group based on the syndrome weight of each frame that is decoded in the time tag group. As another example, a statistic is determined for a NAND block based on the syndrome weight of each frame decoded in the NAND block. As noted above, in some cases a unit of data in the set will not have been decoded since collection of statistics for that set begins. In some cases a unit of data in the set may have been decoded multiple times since collection of statistics for that set begins, in which case the statistic may be based on each decoding of that unit of data.

Step 708 includes mitigating memory health issues based on the statistics. A number of mitigations could be performed. One possible mitigation is to change the read reference levels for reading frames in a particular set. Another possible mitigation is to add a block to a list of candidates for read scrub (also referred to as data refresh). Another possible mitigation is to trigger the use of soft bit reference voltage for a block. Still another possible mitigation is to trigger the use of direct look ahead (DLA) read for a block. Direct look ahead is discussed in further detail below. Step 708 could include one or more of these mitigations, as well as other mitigations.

Figure 8:
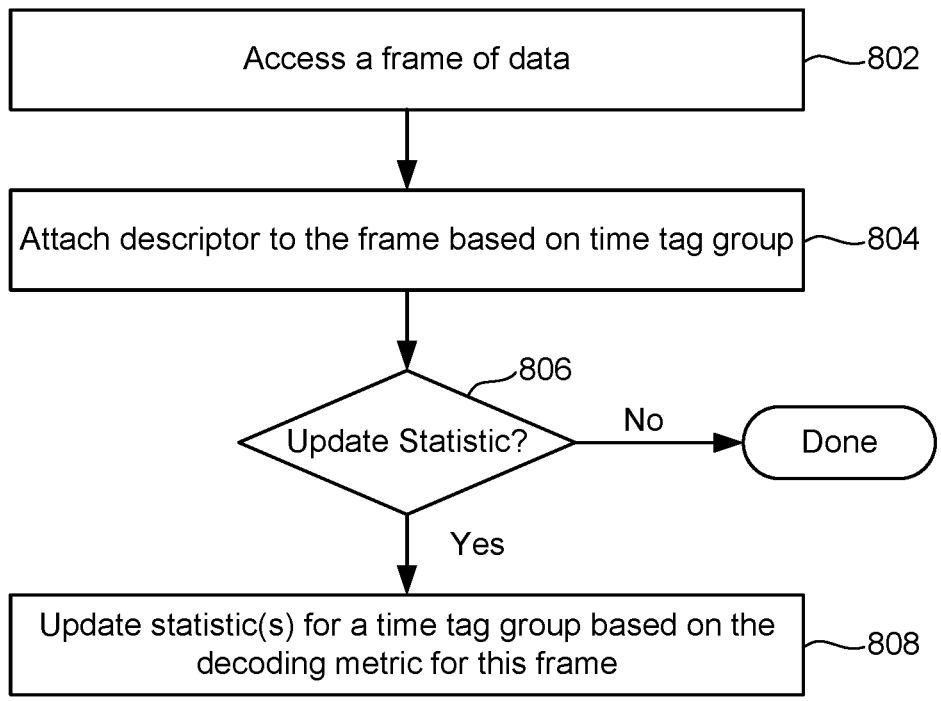
FIG. 8 is a flowchart of one embodiment of a process of collecting statistics for sets, in which the sets are defined based on the time at which the units of data were programmed.

FIG. 8 is a flowchart of one embodiment of a process 800 of collecting statistics for sets, in which the sets are defined based on the read reference voltages used to read the units of data in the particular set. In process 800 units of data that were read using the same read reference voltages are assigned to the same set. Process 800 provides further details for one embodiment of step 706 of process 700. Process 800 describes processing for one frame and may be repeated for each frame that is decoded. Step 802 includes accessing a frame 620 of data. Step 804 includes attaching a descriptor 630 to the frame 620 based on a time tag group associated with that frame. In one embodiment each unit of data is assigned to a set based on the read reference voltages used to read the unit of data. Units of data are read with the same read reference voltages may be assigned to the same set (in this example the set is referred to as a time tag). The read reference voltages that are suitable for a particular unit of data may depend on factors such as when the data was programmed, as well as temperature issues. For example, the temperature at which the data was programmed, as well as the cross-temperature (difference between temperature when programmed and temperature at read) may impact what read reference voltages that are suitable for a particular unit of data.

In an embodiment the descriptor is an in-bit code. For example, the descriptor may be a four-bit code. In one embodiment, one value of the descriptor code is used to indicate that statistics should not be collected for this frame 620. Thus, it is possible that some frames 620 will not be assigned a specific set. Step 806 includes a determination of whether to update the statistics. If the statistics are not to be updated, then the process ends without updating any statistics. If the statistics are to be updated, then the statistics for the time tag group associated with the descriptor 630 are updated in step 808. The update is based on the decoding metric(s) for this frame 620.

Figure 9:
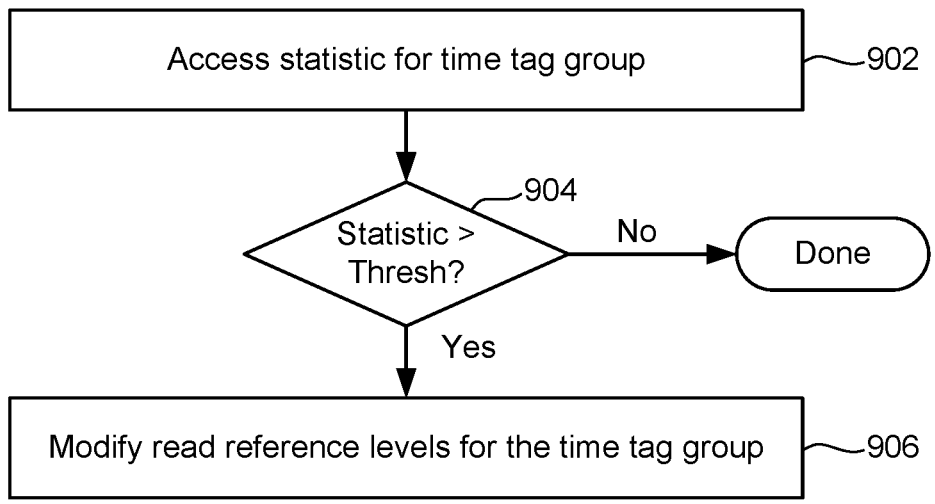
FIG. 9 is a flowchart of one embodiment of a process of mitigating non-volatile memory health problems based on sets defined according to when the data was programmed.

FIG. 9 is a flowchart of one embodiment of a process 900 of mitigating non-volatile memory health problems based on sets defined according to time tag groups. Process 900 provides further details for one embodiment of step 708 of process 700. Process 900 may be used in combination with process 800, but is not limited thereto. Process 900 describes processing for one set and may be repeated for each set for which statistics were collected. Step 902 includes accessing a statistic for this set. Step 904 includes a determination of whether the value of the statistic exceeds a threshold. As one example, the statistic is based on a 2-sigma of the syndrome weights of the frames in the set. For example, a 2-sigma tracker may track the $\mu+2\sigma$ value (e.g., 2 standard deviations above the mean) of a syndrome weight of frames in the set. If, for example, the $\mu+2\sigma$ value exceeds a threshold, health mitigation may be triggered. In an embodiment, if a particular frame in a set is decoded more than once since collection of statistics begins for that set then the 2-sigma tracker may factor in the decoding metric (e.g., SW, FBC) for each time that particular frame is decoded. The mitigation is performed in step 906. In step 906 read reference voltages for the time tag group are modified. However, a different mitigation could be performed in step 906. If the value of the statistic does not exceed the threshold (step 904 is no) then the process 900 ends without triggering mitigation.

In one embodiment, step 906 includes dynamically modifying hard bit read reference voltages. With reference to the three-bit per cell example in FIG. 5A, one or more of the hard bit read reference voltages VrA, VrB, VrC, VrD, VrE, VrF, and/or VrG are modified. Note that the memory cells could store more or fewer than three bits per cell. After the adjustment, the adjusted read hard bit read reference voltages may be applied when reading each frame in the time tag group.

Figure 10:
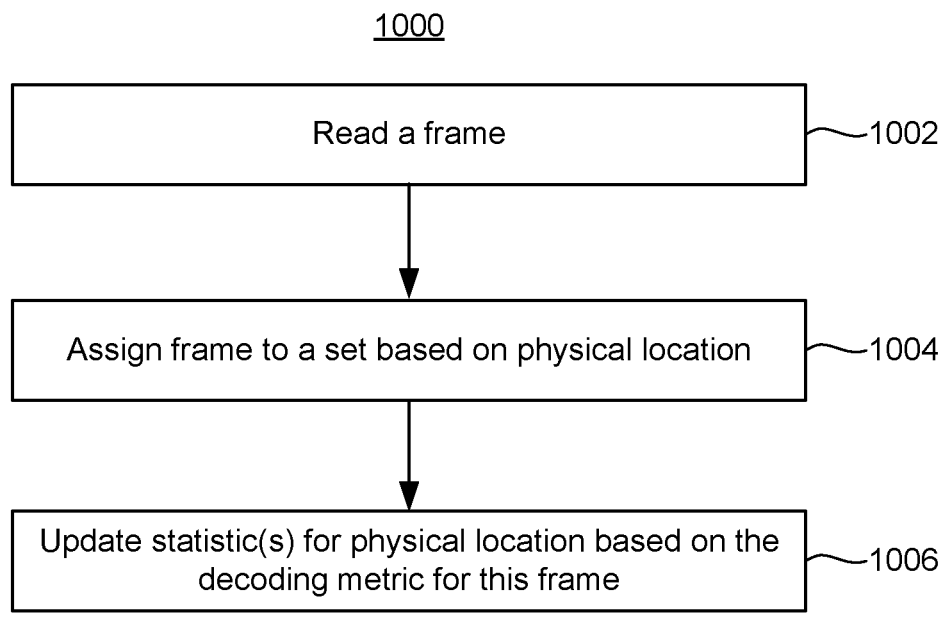
FIG. 10 is a flowchart of one embodiment of a process of collecting statistics for a sets, in which the sets are defined based on the physical location at which the units of data is stored.

FIG. 10 is a flowchart of one embodiment of a process 1000 of collecting statistics for a sets, in which the sets are defined based on the physical location at which the units of data are stored. In process 1000 units of data that are stored in the same region are assigned to the same set. In one embodiment, units of data that are stored in the same block are assigned to the same set. Process 1000 provides further details for one embodiment of step 706 of process 700. Process 1000 describes processing for one frame and may be repeated for each frame that is decoded. Step 1002 includes reading a frame 620 of data. Step 1004 includes assigning the frame to a set based on the physical location of the memory cells that store the frame. In one embodiment, a descriptor 630 is added to the frame 620. In one embodiment, one value of the descriptor code is used to indicate that statistics should not be collected for this frame 620. Thus, it is possible that some frames 620 will not be assigned a specific set. Step 1006 includes updating the statistic(s) for the physical location (e.g., block) based on the decoding metric(s) for this frame.

Figure 11:
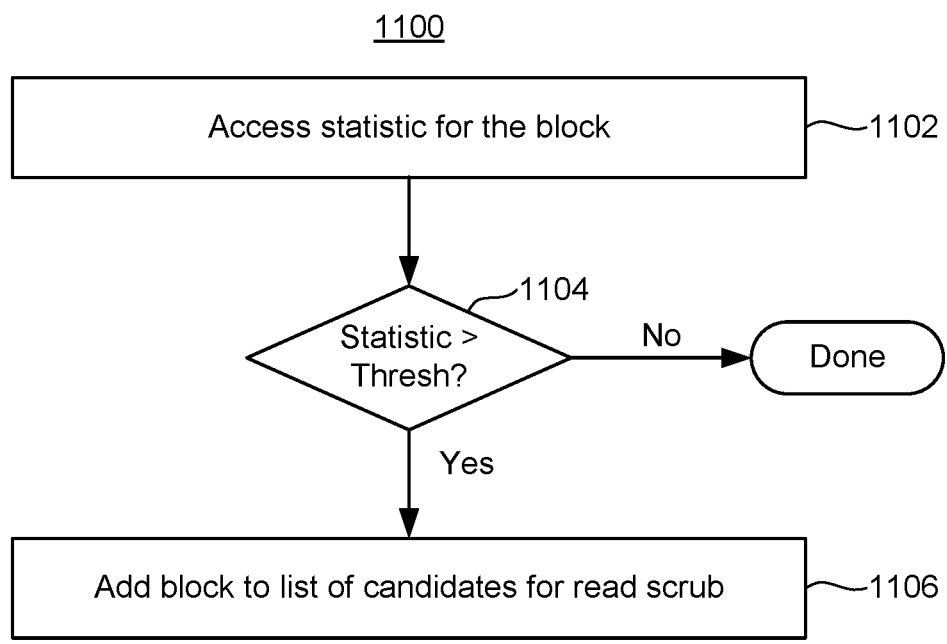
FIG. 11 is a flowchart of one embodiment of a process of mitigating non-volatile memory health problems based on sets defined according to the physical location at which the data is stored.

FIG. 11 is a flowchart of one embodiment of a process 1100 of mitigating non-volatile memory health problems based on sets defined according to the physical location at which the data is stored. In process 1100 the physical location is a block of memory cells. However, the physical location could be some region other than a block. Process 1100 provides further details for one embodiment of step 708 of process 700. Process 1100 may be used in combination with process 1000, but is not limited thereto. Process 1100 describes processing for one set (e.g., one block) and may be repeated for each set (e.g., block) for which statistics were collected. Step 1102 includes accessing a statistic for this block. Step 1104 includes a determination of whether the value of the statistic exceeds a threshold. For example, a 2-sigma tracker may track the $\mu+2\sigma$ value (e.g., 2 standard deviations above the mean) of a syndrome weight of units of data in the block. If, for example, the $\mu+2\sigma$ value exceeds a threshold, health mitigation may be triggered. The mitigation is performed in step 1106. In step 1106 the mitigation is to add the block to a list of candidate blocks for read scrub (or data refresh). If the value of the statistic does not exceed the threshold (step 1104 is no) then the process 1100 ends without triggering mitigation.

Read scrub is way to handle a non-volatile memory cell health issue of data retention. Read scrub may also be referred to as data refresh. Over time issues such as charge loss can cause the non-volatile memory cells to fail to retain data programmed therein. Data retention can depend on issues such as temperature and read disturb. Higher temperatures tend to cause data retention issues. Read disturb may occur when the memory cells are read. In one embodiment, a block that is a candidate for read scrub is analyzed to determine whether to relocate the data stored in that block. Prior to relocating the data, any errors in the data are corrected. Note that in an embodiment data refresh may occur prior to an exception (e.g., failure to decode). Therefore, the mitigation is proactive.

Figure 12:
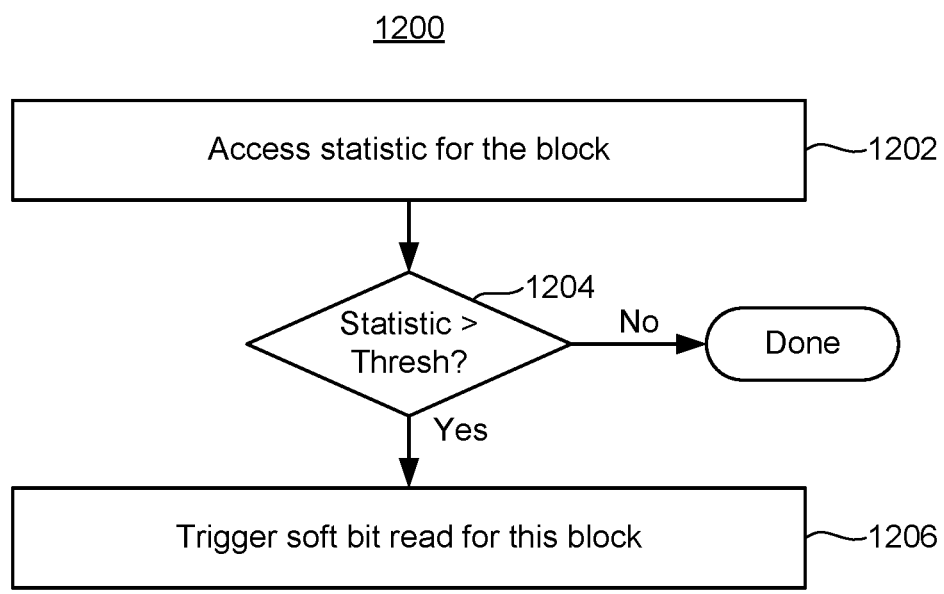
FIG. 12 is a flowchart of one embodiment of a process of mitigating non-volatile memory health problems based on sets defined according to the physical location at which the data is stored.

FIG. 12 is a flowchart of one embodiment of a process 1200 of mitigating non-volatile memory health problems based on sets defined according to the physical location at which the data is stored. In process 1200 the physical location is a block of memory cells. However, the physical location could be some region other than a block. Process 1200 provides further details for one embodiment of step 708 of process 700. Process 1200 may be used in combination with process 1000, but is not limited thereto. Process 1200 describes processing for one set (e.g., one block) and may be repeated for each set (e.g., block) for which statistics were collected. Step 1202 includes accessing a statistic for this block. Step 1204 includes a determination of whether the value of the statistic exceeds a threshold. For example, a 2-sigma tracker may track the $\mu+2\sigma$ value (e.g., 2 standard deviations above the mean) of a syndrome weight of frames in the block. If, for example, the $\mu+2\sigma$ value exceeds a threshold, health mitigation may be triggered. Note that step 1204 could differ from step 1104 in process 110). For example the same statistic could be used in step 1204 as in step 1104, but a different threshold might be used. Also, it is not required that the same statistic be used in step 1204 that is used in step 1104. The mitigation is performed in step 1206. In step 1206 the mitigation is to trigger soft bit read for this block. If the value of the statistic does not exceed the threshold (step 1204 is no) then the process 1200 ends without triggering mitigation for this block.

In one embodiment, step 1206 includes reading each frame (or other unit of data) in the block using soft bit reference voltages (in addition to the hard bit reference voltage). FIG. 513 shows example soft bit reference voltages for a three bit per cell example having two soft bits per hard bit read reference voltage. There could be more or fewer than two soft bits per hard bit reference voltage. The ECC engine may use a combination of the soft bits and hard bits to decode data read from the frame. Using the soft bits may improve an error correction capability of the ECC engine. Note that in an embodiment soft bits may be used prior to an exception (e.g., failure to decode). Therefore, the mitigation is proactive.

Figure 13:
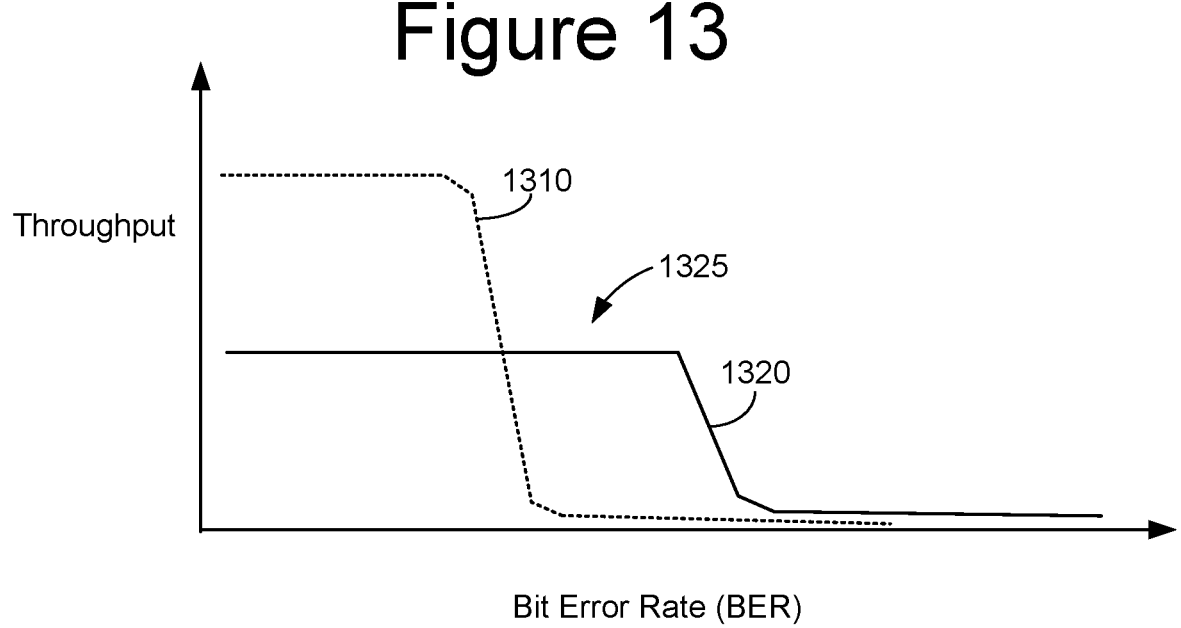
FIG. 13 is a graph that depicts how an embodiment of decoder statistic based triggering of soft bit reads can improve throughput.

FIG. 13 is a graph that depicts how an embodiment of decoder statistic based triggering of soft bit reads can improve throughput. The graph shows throughput versus BER with and without using soft bits. Dashed curve 1310 is for no soft bits. Curve 1320 is for 1 soft bit. If the BER is low then using no soft bits may result in a higher throughput. However, there is a zone of BER wherein using 1 soft bit has a substantially higher throughput than no soft bits. Arrow 1325 point in general to a region of BER in which curve 1320 has a substantially higher throughput than curve 1310. Thus, in that region of BER using 1 soft bit has a substantially higher throughput than no soft bits. In an embodiment, soft bit read may be triggered based on the decoding statistics of sets (e.g., blocks) to provide for a substantially higher throughput than if no soft bits were used.

Figure 14:
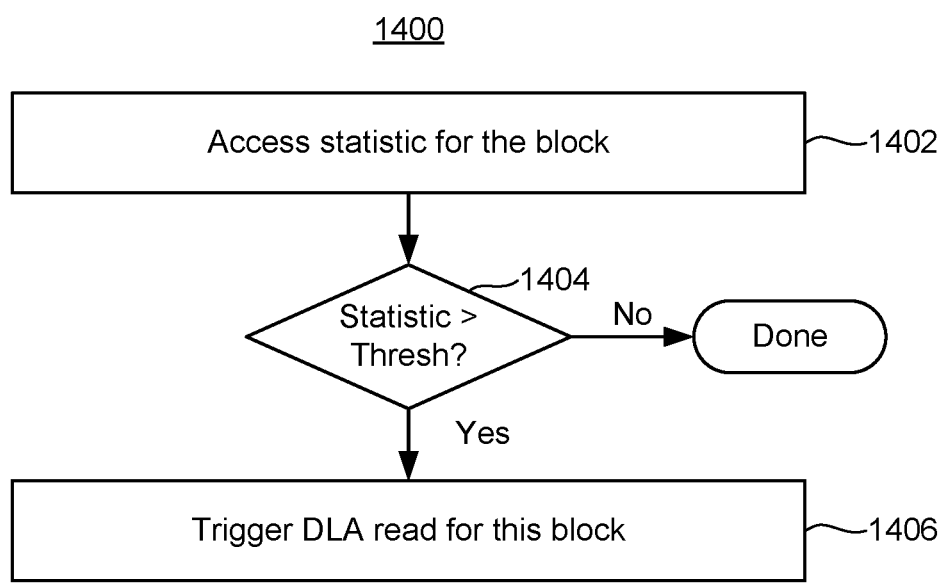
FIG. 14 is a flowchart of one embodiment of a process of mitigating non-volatile memory health problems based on sets defined according to the physical location at which the data is stored.

FIG. 14 is a flowchart of one embodiment of a process 1400 of mitigating non-volatile memory health problems based on sets defined according to the physical location at which the data is stored. In process 1400 the physical location is a block of memory cells. However, the physical location could be some region other than a block. Process 1400 provides further details for one embodiment of step 708 of process 700. Process 1400 may be used in combination with process 1000, but is not limited thereto. Process 1400 describes processing for one set (e.g., one block) and may be repeated for each set (e.g., block) for which statistics were collected. Step 1402 includes accessing a statistic for this block. Step 1404 includes a determination of whether the value of the statistic exceeds a threshold. For example, a 2-sigma tracker may track the μ+2σ value (e.g., 2 standard deviations above the mean) of a syndrome weight of frames in the block. If, for example, the μ+2σ value exceeds a threshold, health mitigation may be triggered. Note that step 1404 could differ from step 1104 in process 100 and/or step 1204 in process 1100. For example the same statistic could be used, but a different threshold might be used. Also, it is not required that the same statistic be used in step 1404 that is used in step 1104 and/or step 1204. The mitigation is performed in step 1406. In step 1406 the mitigation is to trigger direct look ahead (DLA) rea for this block. If the value of the statistic does not exceed the threshold (step 1404 is no) then the process 1400 ends without triggering mitigation for this block.

Direct look ahead (DLA) is a read technique that compensates for interference of neighbor memory cells when reading target memory cells. In an embodiment, a correction or compensation is applied while reading a target cell taking into account the data state of the adjacent memory cell on the adjacent word line. A compensation may be effected by biasing the adjacent word line WLn+1 such that the resultant coupling offsets the effects of programming WLn+1, reducing or eliminating errors during reading the selected word line WLn.

In an embodiment, to read the target word line (WLn) first an adjacent word line (WLn+1) is read. Note that WLn+1 may have been programmed after WLn, which may alter the apparent Vt of the memory cells on WLn. A DLA compensation is determined based on the data states of the cells on WLn+1. It is not necessary to determine the exact data state. For example, in a 1-bit DLA technique it is sufficient to determine which of two contiguous set of data states that a cell is in. In one embodiment, the compensation is applied when reading WLn by the magnitude of the bias voltage to WLn+1. The bias voltage to WLn+1 is a read pass voltage that causes the cells on WLn+1 to act as pass gates. Further details of DLA are described in U.S. Pat. No. 9,721,652, "State Dependent Sensing for Wordline Interference Correction," which is hereby incorporated by reference.

FIGS. 11, 12, and 14 describe several different mitigations that could be performed for the physical region (e.g., block). Other mitigations could also be performed in response to a decoder statistic for the block exceeding a threshold.

In view of the foregoing, a first embodiment includes an apparatus comprising one or more control circuits configured to communicate with non-volatile memory cells. The one or more control circuits configured to decode units of data read from the non-volatile memory cells thereby generating a decoding metric for each unit of data. Each unit of data comprises at least one error correcting code (ECC) codeword. The one or more control circuits are configured to collect statistics for a plurality of sets of the units of data. The statistic for a particular set is based on the decoding metrics for the units of data in the particular set. The one or more control circuits are configured to mitigate memory health issues in the non-volatile memory cells based on the statistics.

In a second embodiment, in furtherance to the first embodiment, the one or more control circuits are further configured to assign each unit of data to a set of the plurality of sets based on read reference voltages used to read the unit of data. Units of data that are read with the same read reference voltages are assigned to the same set.

In a third embodiment, in furtherance to the first or second embodiment, the one or more control circuits are further configured to assign each unit of data to a set of the plurality of sets based on a physical region of the memory cells that store the unit of data. Units of data that are stored in memory cells in the same physical region are assigned to the same set.

In a fourth embodiment, in furtherance to the third embodiment, the physical regions are blocks. Each block comprises a plurality of NAND strings having the memory cells. Each block has a plurality of word lines connected to control gates of the memory cells.

In a fifth embodiment, in furtherance any of the first to fourth embodiments, the metric for each respective unit of data includes a syndrome weight (SW) of the at least one ECC codeword of the respective unit of data.

In a sixth embodiment, in furtherance of any of the first to fourth embodiments, the metric for each respective unit of data includes a fail bit count (FBC) of the at least one ECC codeword of the respective unit of data.

In a seventh embodiment, in furtherance any of the first to sixth embodiments, to mitigate memory health issues the one or more control circuits are further configured to change a technique for reading the units of data in a particular set of the plurality of sets in response to the statistic for the particular set exceeding a threshold.

In an eighth embodiment, in furtherance to any of the first to seventh embodiments, to mitigate memory health issues the one or more control circuits are further configured to modify read reference voltages for a particular set of the plurality of sets in response to the statistic for the particular set exceeding a threshold.

In a ninth embodiment, in furtherance to any of the first to eighth embodiments, to mitigate memory health issues the one or more control circuits are further configured to trigger soft bit read for a particular set of the plurality of sets in response to the statistic for the particular set exceeding a threshold.

In a tenth embodiment, in furtherance to any of the first to ninth embodiments, to mitigate memory health issues the one or more control circuits are further configured to trigger direct look ahead (DLA) read for a particular set of the plurality of sets in response to the statistic for the particular set exceeding a threshold.

In an eleventh embodiment, in furtherance to any of the first to tenth embodiments, to mitigate memory health issues the one or more control circuits are further configured to add a particular set of the plurality of sets as a candidate for read refresh in response to the statistic for the particular set exceeding a threshold.

One embodiment includes a method for managing non-volatile storage. The method comprises reading a plurality of frames from the non-volatile storage, each frame comprising one or more error correcting code (ECC) codewords. The method comprises decoding the one or more ECC codewords of each respective frame of the plurality of frames. The method comprises determining a decoding metric for each decoded frame based on decoding the one or more ECC codewords of the decoded frame. The method comprises determining, for each respective set of a plurality of sets of frames, a statistic based on the decoding metrics for the frames in the respective set. The method comprises triggering memory health problem mitigation for one or more of the sets based on the statistic for the corresponding one or more of the sets.

One embodiment includes a non-volatile storage system comprising non-volatile memory cells. The non-volatile storage system includes means for decoding frames of data read from the non-volatile memory cells, wherein each frame comprises one or more error correcting code (ECC) codewords, wherein decoding a frame produces a decoding metric. The non-volatile storage system includes means for collecting a statistic for each set of a plurality of sets of the frames, wherein the statistic for a particular set is based on the decoding metrics for the frames in the particular set. The non-volatile storage system includes means for managing reading of the frames in each respective set from the non-volatile memory cells based on the statistic for the respective set.

In embodiments, the means for decoding frames of data read from the non-volatile memory cells comprises one or more of memory controller 102, BEP 112, ECC 226/256, decoder 606, a processor, an FPGA, an ASIC, and/or an integrated circuit. In an embodiment, the means for decoding frames of data read from the non-volatile memory cells comprises an LDCP decoder.

In embodiments, the means for collecting a statistic for each set of a plurality of sets of the frames comprises one or more of memory controller 102, FEP 110, BEP 112, MML 158, statistics module 270, a processor, an FPGA, an ASIC, and/or an integrated circuit. In an embodiment, the means for collecting a statistic for each set of a plurality of sets of the frames performs process 800. In an embodiment, the means for collecting a statistic for each set of a plurality of sets of the frames performs process 1000.

In embodiments, the means for managing reading of the frames in each respective set from the non-volatile memory cells based on the statistic for the respective set comprises one or more of memory controller 102, FEP 110, BEP 112. MML 158, statistics module 270, a processor, an FPGA, an ASIC, and/or an integrated circuit. In an embodiment, the means for managing reading of the frames in each respective set from the non-volatile memory cells based on the statistic for the respective set performs one or more of process 900, process 1100, process 1200, and/or process 1400.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
one or more control circuits configured to communicate with non-volatile memory cells, the one or more control circuits configured to:
decode units of data read from the non-volatile memory cells thereby generating a decoding metric for each unit of data, wherein each unit of data comprises at least one error correcting code (ECC) codeword;
collect a statistic for each of a plurality of sets of the units of data, wherein the statistic for each set is based on a standard deviation of the decoding metrics for the units of data in the set, wherein the statistic for each respective set is a value "r" standard deviations added to a mean value of the decoding metric for the units of data in the respective set, wherein "r" is a positive real number; and
mitigate memory health issues in a first set of the plurality of sets in the non-volatile memory cells in response to the value of the statistic of "r" standard deviations added to the mean value for the first set exceeding a threshold.

2. The apparatus of claim 1, wherein the one or more control circuits are configured to:
assign each unit of data to a set of the plurality of sets based on read reference voltages used to read the unit of data, wherein units of data that are read with the same read reference voltages are assigned to the same set.

3. The apparatus of claim 1, wherein the one or more control circuits are configured to:
assign each unit of data to a set of the plurality of sets based on a physical region of the memory cells that store the unit of data, wherein units of data that are stored in memory cells in the same physical region are assigned to the same set.

4. The apparatus of claim 3, wherein the physical regions are blocks, each block comprising a plurality of NAND strings having the memory cells, and a plurality of word lines connected to control gates of the memory cells.

5. The apparatus of claim 1, wherein the metric for each respective unit of data includes a syndrome weight (SW) of the at least one ECC codeword of the respective unit of data.

6. The apparatus of claim 1, wherein the metric for each respective unit of data includes a fail bit count (FBC) of the at least one ECC codeword of the respective unit of data.

7. The apparatus of claim 1, wherein to mitigate memory health issues the one or more control circuits are further configured to:
change a technique for reading the units of data in the first set of the plurality of sets in response to the statistic based on the standard deviation for the first set exceeding the threshold.

8. The apparatus of claim 1, wherein to mitigate memory health issues the one or more control circuits are further configured to:
modify read reference voltages for the first set of the plurality of sets in response to the statistic based on the standard deviation for the first set exceeding the threshold.

9. The apparatus of claim 1, wherein to mitigate memory health issues the one or more control circuits are further configured to:
trigger soft bit read for the first set of the plurality of sets in response to the statistic based on the standard deviation for the first set exceeding the threshold.

10. The apparatus of claim 1, wherein to mitigate memory health issues the one or more control circuits are further configured to:
trigger direct look ahead (DLA) read for the first set of the plurality of sets in response to the statistic based on the standard deviation for the first set exceeding the threshold.

11. The apparatus of claim 1, wherein to mitigate memory health issues the one or more control circuits are further configured to:
add the first set of the plurality of sets as a candidate for read refresh in response to the statistic based on the standard deviation for the first set exceeding the threshold.

12. A method for managing non-volatile storage, the method comprising:
reading a plurality of frames from the non-volatile storage, each frame comprising one or more error correcting code (ECC) codewords;
decoding the one or more ECC codewords of each respective frame of the plurality of frames;
determining a decoding metric for each decoded frame based on decoding the one or more ECC codewords of the decoded frame;
determining, for each respective set of a plurality of sets of frames, a statistic based on the decoding metrics for the frames in the respective set, wherein the statistic for each respective set is a value "r" standard deviations added to a mean value of the decoding metric for each decoded frame in the respective set, where "r" is a positive real number; and
triggering memory health problem mitigation for one or more of the sets in response to the statistic for the corresponding one or more of the sets of r standard deviations added to the mean value exceeding a threshold.

13. The method of claim 12, wherein determining the decoding metric for each decoded frame based on decoding the one or more ECC codewords of the decoded frame comprises determining a syndrome weight for each decoded frame.

14. The method of claim 12, wherein triggering memory health problem mitigation for one or more of the sets based on the statistic for the corresponding one or more sets comprises:
managing reading of the frames in each respective set from the non-volatile storage based on the statistic for the respective set.

15. The method of claim 12, further comprising:
assigning each frame of the plurality of frames to one of the sets based on read reference voltages used to read the frame, wherein frames that are read with the same time read reference voltages are assigned to the same set, wherein triggering memory health problem mitigation for a particular set based on the statistic for the particular set comprises updating the read reference voltages for the particular set.

16. A non-volatile storage system comprising:
non-volatile memory cells;
means for decoding frames of data read from the non-volatile memory cells, wherein each frame comprises one or more error correcting code (ECC) codewords, wherein decoding a frame produces a decoding metric;
means for collecting a statistic for each set of a plurality of sets of the frames, wherein the statistic for a particular set is a value "r" standard deviations added to a mean value for the decoding metrics for the frames in the particular set, where "r" is a positive real number; and
means for managing reading of the frames in each respective set from the non-volatile memory cells in response to the value of the statistic of "r" standard deviations added to the mean value for the respective set exceeding a threshold.

17. The non-volatile storage system of claim 16, wherein the means for managing reading of the frames in each respective set from the non-volatile memory cells based on the statistic for the respective set is configured to:
modify read reference voltages for a particular set of the frames in response to the statistic for the particular set exceeding the threshold.

18. The non-volatile storage system of claim 16, wherein the means for managing reading of the frames in each respective set from the non-volatile memory cells based on the statistic for the respective set is configured to:
read each frame in a particular set of the frames at soft bit reference levels in response to the statistic for the particular set exceeding the threshold.

19. The non-volatile storage system of claim 16, wherein the means for managing reading of the frames in each respective set from the non-volatile memory cells based on the statistic for the respective set is configured to:
trigger direct look ahead (DLA) read for a particular set of the frames in response to the statistic for the particular group exceeding the threshold.

20. The non-volatile storage system of claim 16, wherein the means for managing reading of the frames in each respective set from the non-volatile memory cells based on the statistic for the respective set is configured to:
evaluate a particular set of the frames for data refresh in response to the statistic for the particular set exceeding the threshold;
relocate data of the particular set of the frames in response to a determination to refresh the data; and
keep the data of the particular set of the frames in place in response to a determination to not relocate the data.

* * * * *